(12) United States Patent
Hauge et al.

(10) Patent No.: US 12,509,951 B2
(45) Date of Patent: Dec. 30, 2025

(54) METHOD AND SYSTEM FOR MONITORING INFLUX AND LOSS EVENTS IN A WELLBORE

(71) Applicant: Equinor Energy AS, Stavanger (NO)

(72) Inventors: Espen Hauge, Trondheim (NO); John-Morten Godhavn, Trondheim (NO); Steinar Elgsæter, Trondheim (NO)

(73) Assignee: Equinor Energy AS, Stavanger (NO)

( * ) Notice: Subject to any disclaimer, the term of this patent is extended or adjusted under 35 U.S.C. 154(b) by 545 days.

(21) Appl. No.: 17/830,906

(22) Filed: Jun. 2, 2022

(65) Prior Publication Data

US 2022/0290516 A1 Sep. 15, 2022

Related U.S. Application Data

(63) Continuation of application No. 16/629,863, filed as application No. PCT/NO2018/050186 on Jul. 11, 2018, now Pat. No. 11,384,612.

(30) Foreign Application Priority Data

| Jul. 11, 2017 | (GB) | ................................. | 1711152 |
| Mar. 15, 2018 | (GB) | ................................. | 1804179 |

(51) Int. Cl.
*E21B 21/08* (2006.01)
*E21B 21/00* (2006.01)
(Continued)

(52) U.S. Cl.
CPC ............ *E21B 21/08* (2013.01); *E21B 21/003* (2013.01); *E21B 47/10* (2013.01); *E21B 49/0875* (2020.05)

(58) Field of Classification Search
CPC .... E21B 49/0875; E21B 21/003; E21B 47/10; E21B 21/08
See application file for complete search history.

(56) References Cited

U.S. PATENT DOCUMENTS

| 4,606,415 A | 8/1986 | Gray, Jr. et al. |
| 5,154,078 A | 10/1992 | Codazzi |
| (Continued) | | |

FOREIGN PATENT DOCUMENTS

| EP | 0498128 A1 | 8/1992 |
| EP | 2500510 A2 | 9/2012 |
| (Continued) | | |

OTHER PUBLICATIONS

Sep. 27, 2018—(WO) International Search Report and Written Opinion—App PCT/NO2018/050186.
(Continued)

*Primary Examiner* — Lisa M Caputo
*Assistant Examiner* — Nyla Gavia
(74) *Attorney, Agent, or Firm* — Banner & Witcoff, Ltd.

(57) ABSTRACT

Methods of monitoring for influx and/or loss events in a wellbore are disclosed. One method comprises: receiving a measurement relating to fluid entering or leaving the wellbore, wherein the measurement is selected from flow out rate and active volume; and comparing the measurement with an expected value for the measurement to provide a deviated measurement value. The method further comprises receiving a pump pressure value of a pump associated with the wellbore; and comparing the pump pressure value with an expected pump pressure value to provide a deviated pump pressure value. It is then established whether an influx event and/or it is established whether a loss event may have occurred based on at least the deviated measurement value and deviated pump pressure value. Systems configured to
(Continued)

monitor for influx and/or loss events in a wellbore are also disclosed.

17 Claims, 7 Drawing Sheets

(51) Int. Cl.
  *E21B 47/10* (2012.01)
  *E21B 49/08* (2006.01)

(56) References Cited

U.S. PATENT DOCUMENTS

| | | | |
|---|---|---|---|
| 5,205,165 | A | 4/1993 | Jardine et al. |
| 8,689,904 | B2 | 4/2014 | Coates et al. |
| 9,019,118 | B2 | 4/2015 | Milne et al. |
| 9,708,898 | B2 | 7/2017 | Milner et al. |
| 2009/0078411 | A1 | 3/2009 | Kenison et al. |
| 2009/0294174 | A1 | 12/2009 | Harmer et al. |
| 2013/0146359 | A1 | 6/2013 | Koederitz |
| 2013/0325351 | A1* | 12/2013 | Haberer ............ E21B 47/10 702/12 |
| 2013/0327533 | A1 | 12/2013 | Veeningen |
| 2014/0345940 | A1* | 11/2014 | Milner ............ E21B 47/10 175/24 |
| 2016/0097270 | A1 | 4/2016 | Pobedinski et al. |
| 2016/0245027 | A1 | 8/2016 | Gumus et al. |
| 2017/0356259 | A1* | 12/2017 | Culen ............ E21B 47/047 |
| 2018/0187498 | A1 | 7/2018 | Sanchez Soto et al. |
| 2018/0291728 | A1 | 10/2018 | Erge et al. |

FOREIGN PATENT DOCUMENTS

| | | | |
|---|---|---|---|
| EP | 2999846 | A2 | 3/2016 |
| WO | 0250398 | A1 | 6/2002 |
| WO | 2011014171 | A1 | 2/2011 |
| WO | 2012162212 | A2 | 11/2012 |
| WO | 2013/126388 | A1 | 8/2013 |
| WO | 2013126064 | A1 | 8/2013 |
| WO | 2013/181143 | A1 | 12/2013 |
| WO | 2013184676 | A1 | 12/2013 |
| WO | 2014055090 | A1 | 4/2014 |
| WO | 2014/066981 | A1 | 5/2014 |
| WO | 2014155126 | A2 | 10/2014 |
| WO | 2014189992 | A2 | 11/2014 |
| WO | 2015159071 | A1 | 10/2015 |
| WO | 2016/040310 | A1 | 3/2016 |
| WO | 2016153636 | A1 | 9/2016 |
| WO | 2016/164881 | A1 | 10/2016 |
| WO | 2016205469 | A1 | 12/2016 |
| WO | 2017035658 | A1 | 3/2017 |
| WO | WO-2017174746 | A1 * | 10/2017 ............ E21B 43/26 |
| WO | 2019125494 | A1 | 6/2019 |

OTHER PUBLICATIONS

Nov. 30, 2017—(GB) Search Report—APP 1711152.7.
May 1, 2018—(GB) Search Report—APP 1711152.7.
Aug. 1, 2018—(GB) Search Report—APP 1804179.8.
Andia et al. "A Cyber-Physical Approach to Early Kick Detection" IADC/SPE Drilling Conference and Exhibition, Texas, USA, 2018.
Li et al. "A New Approach for Early Gas Kick Detection" SPE International Conference and Exhibition, Beijing, China, 1998.
Orban et al. "Accurate Flow-Out Measurement for Kick Detection, Actual Response to Controlled Gas Influxes" ADC/SPE Drilling Conference, Texas, USA, Feb. 28-Mar. 2, 1998.
Johnson et al. "Advancing Deepwater Kick Detection", IADC/SPE Drilling Conference and Exhibition, Texas, USA, Mar. 4-6, 2014.
Jardine et al. "An Improved Kick Detection System for Floating Rigs", SPE, Offshore Europe Conference, Aberdeen, Sep. 3-6, 1991.
Haeusler et al. "Applications and Field Experience of an Advanced Delta Flow Kick; Detection System", SPE/IADC Drilling Conference Amsterdam, 1995.
Ali et al. "Automated Alarms for Smart Flowback Fingerprinting and Early Kick Detection" SPE/IADC Drilling Conference and Exhibition, Amsterdam, 2013.
Ibarra et al. "Automatic Kick Detection Method and Preliminary Results" SPE/IADC Managed Pressure Drilling and Underbalanced Operations Conference and Exhibition, Texas, USA, 2016.
Godhavn. "Data-driven methods in drilling automation" SINTEF Petroleum Conference 20-21/3—2018.
Deepwater Horizon Accident Investigation Report. Sep. 8, 2010.
Godhavn et al. Drilling Automation Industrial Challenges and Solutions. Fourth International Colloquium on Nonlinear dynamics and control of deep drilling systems. Norway, 2018.
Hargreaves et al. "Early Kick Detection for Deeptwater Drilling: New Probabilistic Methods Applied in the Field" SPE Annual Technical Conference and Exhibition, Louisiana, USA, 2001.
Fraser et al. "Early Kick Detection Methods and Technologies" SPE Annual Technical Conference and Exhibition, Amsterdam, 2014.
Pournazari et al. "Enhanced Kick Detection with Low-Cost Rig Sensors through Automated Pattern Recognition and Real-Time Sensor Calibration" SPE Middle East Intelligent Oil and Gas Conference & Exhibition, Abu Dhabi, 2015.
SPE "DSATS: From Sensors to Solutions" The San Luis Resort, Spa & Conference Center , 2015.
Stokka et al. "Gas Kick Warner—An Early Gas Influx Detection Method" SPE/IADC Drilling Conference, Amsterdam, 1993.
Morooka et al. "Heave Motion Effects on Kick and Lost Circulation Detection; in Floating Drilling Rigs" Eighth International Offshore and polar Engineering Conference, Canada, 1998.
Nas, Steve. "Kick Detection and Well Control in a Closed Wellbore" IADC/SPE Managed Pressure Drilling And Underbalanced Operations Conference and Exhibition, Colorado, USA, 2011.
Doria et al. "Kick Detection in Floating Drilling Rigs" SPE Fifth Latin America and Caribbean Petroleum Engineering Conference and Exhibition, Rio de Janeiro, Brazil, 1997.
Godhavn. "Kick Detection" DrillWell Annual Seminar, Sep. 25-26, 2018.
Tarr et al. "Next Generation Kick Detection during Conenctions: Influx Detection at Pumps Stop (IDAPS) Software" IADC/SPE Drilling Conference and Exhibition, Texas, USA, 2016.
Carlsen et al. "Performing the Dynamic Shut-In Procedure Because of a Kick Incident When Using Automatic Coordinated Control of Pump Rates and Choke-Valve Opening" SPE/IADC Managed Pressure Drilling and Underbalanced Operation Conference and Exhibition, Abu Dhabi, 2008.
Cayeux. "Precise Gain and Loss Detection Using a Transient Hydraulic Model of the Return Flow to the Pit", SPE/IADC Middle East Drilling Technology Conference and Exhibition, Dubai, 2013.
Aarsnes et al. "Nonlinear Dynamics and Control of Deep Drilling Systems" Fourth International Colloquium, Stavanger, May 14-16, 2018.
Al-Morakhi et al. "Real Time Advanced Flow Analysis for Early Kick/Loss Detection & Identification of Open Fractures" SPE Kuwait Oil and Gas Show and Conference, Oct. 7-10, 2013.
Brakel et al. "Smart Kick Detection; First Step on the Well Control Automation Journey" SPE/IADC Drilling Conference and Exhibition, London, Mar. 17-19, 2015.
Velmurugan et al. "WellCON: An Early Kick Detection System" SPE Abu Dhabi International Petroleum Exhibition and Conference, Nov. 9-12, 2015.
Web page—CoVar—Case Studies, Adaptive Alarms. <https://www.covar.com/adaptive-drilling-alarms.php>.
Feb. 23, 2021 (NO)—Search Report Norwegian Application No. 20200018.

* cited by examiner

METHOD AND SYSTEM FOR MONITORING INFLUX AND LOSS EVENTS IN A WELLBORE

The present application is a continuation of U.S. application Ser. No. 16/629,863, filed Jan. 9, 2020, which is a U.S. National Phase of International Application No. PCT/NO2018/050186, filed on Jul. 11, 2018, designating the United States of America, and claims priority to British Patent Application No. 1711152.7, filed on Jul. 11, 2017 and British Patent Application No. 1804179.8, filed on Mar. 15, 2018. This application claims priority to and the benefit of the above-identified applications, which are fully incorporated by reference herein in their entirety.

The present invention relates to monitoring for influx and loss events. In particular, it relates to methods and systems for establishing whether an influx and/or loss event in a wellbore may have occurred, through the analysis of measurements relating to fluid entering or leaving the wellbore.

With reference to FIG. 2, during the drilling of an onshore or offshore well for the production of oil and/or gas hydrocarbons, the wellbore (or borehole) is created by drilling a hole into the earth with a drilling rig that rotates a drill string or drill pipe (G) with a bit (H) attached. The drill string is hollow, so that drilling fluid (or mud) can be pumped down through it via rig pump(s) C and standpipe E and circulated back up the void between the drill string and the wellbore, known as the annulus (K). As the drilling fluid returns to the surface via the annulus, it carries with it the cuttings of rock excavated by the drill bit. Shakers (J) are provided to remove the cuttings from the returned drilling mud. The drilling fluid also serves to prevent destabilisation of the rock in the wellbore walls, and to overcome the pressure of fluids inside the rock (or formation) so that these fluids do not enter the wellbore. A trip tank B is also provided, from which mud is pumped via trip tank pump D through trip tank pipe L and into the top of the annulus. The trip tank pump is not run at the same time as the rig pump(s). This is all well known technology.

If the pressure found within the drilled rock is higher than the mud pressure acting on the borehole (e.g. the pore pressure is higher than the well pressure), a kick event can occur (a kick event is an influx on a considerable scale, requiring careful well control), where the greater formation pressure forces formation fluids into the wellbore. An undetected and uncontrolled kick may ultimately lead to a blowout with hydrocarbons flowing out at the drill floor and a potential disaster.

If the fracture pressure within the drilled rock or formation strength is less than the mud pressure acting on the borehole, a loss event can occur, where the drilling fluid or mud flows into the formation (i.e. there is a loss of drilling fluids from the well). This could lead to, for example, a well collapse or an influx higher up the well. It is therefore important to detect kick or loss events early, so that blowouts can be prevented.

Indicators of kick and loss events include:

Active volume (O1)—the active volume is the total volume of a number of large tanks (pits) (A) that hold drilling fluid on the rig. An increase in the active volume can indicate a kick event, while a decrease in active volume can indicate a loss event. However, the active volume is also affected by, for example, the motion of the rig. The distance between the well floor and the pits can be of the order of a hundred metres. There is a small time delay from a kick or loss event occurring downhole before it can be seen on the flow out on the drill floor and a longer time delay until it can be seen in the measurement of the active volume which is further away. Every time the pump (C) is switched off, there is an increase in the active volume, as the topside pipes are drained when circulation stops. A secondary effect causing topside volume increase is the expansion of the drilling fluid in the well as the pressure is reduced when the circulation stops. This volume increase is referred to as a flow back. A similar reduction in active volume is experienced when the pumps are started again, filling the topside pipes partially with mud. It is therefore challenging for an operator to detect small kick or loss events based on active volume alone. During drilling the active volume is given by the sum of active pits, i.e. tanks on the rigs containing drilling fluid. During tripping, flow checks and other events, the smaller trip tank (B) is often used as the active volume.

Flow out rate—a paddle or flap is often provided to measure the flow out rate from the well. An increase in the flow out rate can indicate a kick, while a decrease can indicate a loss. Flow rate measurements are often less accurate indicators than active volume, but there is less of a delay in taking the measurement, than for determining active volume, as the flow out (O3) is measured closer to the top of the well.

Presently, on many rigs, influx (e.g. kick) and loss detection depends on driller and mud logger awareness. Operators monitor parameter trends, for example active volume, flow rate and the weight on the drill bit, and use their experience of what is normal behavior to determine whether a kick or loss event has occurred. During tripping they can use a trip sheet with the expected volume changes based on steel volume in or out of the well.

Influx (e.g. kick) and loss detection based on driller awareness often works well, however this is heavily reliant on driller experience, and work-load becomes crucial. An undetected event can escalate into a severe situation (for example, a blowout or a technical side track) if not handled early. Kicks and losses during transient events such as pumps off are particularly challenging to detect.

Existing technologies for detecting kick and loss events include simple solutions based on active volume, with alerts to the operator being raised if the active volume exceeds or falls below threshold values. Often, these are not sufficiently accurate and raise false alarms.

Other systems, such as services based on high accuracy flow meter monitoring can be used, but these are high cost, owing to the requirement to modify the rig to install expensive equipment, and to provide 24-hour monitoring with experts being onsite.

WO 2014/189992 A2 discloses an automated system for detecting fluid influx into a wellbore during the transient events that occur when the pumps are stopped. The system comprises at least one sensor normally employed on a drilling rig for measuring at least one parameter, wherein the parameter is one of flow rate and pit (active) volume, and a processor for receiving a signal indicative of the parameter from the sensor. The processor is programmed to analyse a plurality of values of the parameter measured during a plurality of previous events so as to generate a predetermined threshold value, compare the deviation between the measured signal and an expected value for the same to the predetermined threshold value, and provide an output signal indicative of fluid influx when the deviation is above the predetermined threshold value.

If a kick or loss event is detected, drilling is stopped and well control procedures are used to handle the situation. This can go on for a number of days. If the situation is more severe, the wellbore may need to be plugged and the on-going section must be re-drilled with a side track, in which event lost time can be up to a month. The earlier a kick or loss can be detected, the easier it is to handle the situation, so that it does not develop into something more serious.

Thus, there remains a need for an improved method and system for detecting influx and loss events at a wellbore during drilling of a hydrocarbon well.

Viewed from a first aspect, the invention provides a method of monitoring for influx and/or loss events in a wellbore, comprising: receiving a measurement relating to fluid entering or leaving the wellbore, wherein the measurement is selected from flow out rate and active volume; comparing the measurement with an expected value for the measurement to provide a deviated measurement value; receiving a pump pressure value of a pump associated with the wellbore; comparing the pump pressure value with an expected pump pressure value to provide a deviated pump pressure value; and establishing whether an influx event and/or establishing whether a loss event may have occurred based on at least the deviated measurement value and deviated pump pressure value.

It will be appreciated that the term "deviated measurement value" and "deviated pump pressure value" simply means the value of the difference between the measured and expected values for the measurement and pump pressure respectively. As is described elsewhere in this specification, the measured value may be an actual measured value or a calibrated measured value.

It will be appreciated that flow out rate and active volume may be considered as variables relating to fluid entering or leaving the wellbore, and the measurement is therefore a measurement of one of these variables. Thus, this aspect of the invention may alternatively be considered to receive a measurement of a variable, wherein the variable is selected from flow out rate and active volume. Thus, put differently, the invention provides a method of monitoring for influx and/or loss events in a wellbore, comprising: receiving a measurement of a variable relating to fluid entering or leaving the wellbore, wherein the variable is selected from flow out rate and active volume; comparing the measurement with an expected value for the measurement to provide a deviated measurement value; receiving a pump pressure value of a pump associated with the wellbore; comparing the pump pressure value with an expected pump pressure value to provide a deviated pump pressure value; and establishing whether an influx event and/or establishing whether a loss event may have occurred based on at least the deviated measurement value and deviated pump pressure value.

It will be appreciated that "flow out rate" may also be termed "return flow".

As is described elsewhere in this specification, in the case of flow out rate, the measurement of flow out may be calibrated, and the deviated flow out rate may be based on the difference between the calibrated measurement of flow out rate and the expected measurement of flow out rate.

As is described later in relation to the system of the invention, a processor may carry out certain steps. So, for example, in the method described above, the comparing and establishing steps may be carried out by a processor. Moreover, the receiving steps may comprise receiving at the processor. It will be readily appreciated that other preferable and optional steps described below may also be carried out preferably by a processor.

The present invention establishes whether an influx event and/or establishes whether a loss event may have occurred, including small influxes and those on a greater scale, i.e. those influxes known as "kicks". The size of influx detectable will depend on the alarm conditions that are set (discussed later). In some embodiments, the method establishes only whether an influx event may have occurred. In other embodiments, the method establishes only whether a loss event may have occurred. But preferably, the method establishes whether an influx event may have occurred and also whether a loss event may have occurred, in other words it is monitoring for both types of events. Thus, in an embodiment, the method of the invention is able to monitor for loss events and establish whether such an event may have occurred, and is also able to monitor for influx events and establish whether such an event may have occurred. An influx event and a loss event can in fact occur at the same time; but this is difficult to establish from the available measurements, and the method of the invention is not designed to detect this.

A change in the pump pressure (O2) may indicate an influx or loss event. During a loss, the flow out rate in the annulus will decrease and hence the frictional pressure drop will also decrease. Hence, a decrease in pump pressure may be indicative of a loss event. Conversely, during an influx (e.g. a kick), as formation fluid flows into the wellbore, then the flow out rate in the annulus will increase and hence the frictional pressure drop will increase. On the other side the hydrostatic pressure exerted by the annular column of fluid will decrease if the formation fluid is lighter than the drilling fluid. Hence, an increase in pump pressure followed by a gradual pump pressure reduction may be indicative of an influx event. One can also distinguish between a loss and an influx by additionally monitoring the flow out rate and active volume.

The present inventors have recognised that utilizing the pump pressure to monitor for influx and loss events at a wellbore, as set out in the first aspect of the invention above, leads to significant advantages over the prior art methods discussed earlier. For example, the pump pressure can be measured at the rig, so there is no delay in measurement, allowing for earlier detection of possible influx or loss events. Moreover, the method can be used during pumps off and other transient events, which are normally particularly challenging to detect. By a pumps off event, it will be understood that this means the transient period for the first few minutes after the driller shuts down the pumps. Due to the inertia of the drilling fluid (mud), it will keep flowing out of the well for typically around 30 seconds, even the pumps will rotate for maybe 10-20 seconds, since it is a lot of rotating mass that must be stopped.

The skilled person would readily appreciate what is meant by pump pressure since it is a very well-known term in the art. However, to explain further, the term "pump pressure" means the pressure downstream of the rig pump(s) that pumps fluid into the drill pipe. In particular it may mean the pressure downstream of the rig pump and upstream of a drill pipe through which fluid, pumped by the pump, enters the wellbore.

The pipe provided between the pump and the drill pipe is termed a standpipe. The pump(s) pump fluid through the standpipe and into the drill pipe. The pressure in this standpipe is therefore almost the same as the pump pressure: the pressure downstream of the pump and upstream of the drill pipe. Thus, as is well known in the art, a measurement of the standpipe pressure can be considered as the pump pressure. Consequently, as would be readily understood by the skilled person, the terms "standpipe pressure" and "pump pressure" are often used interchangeably to mean the same thing. Thus, where "pump pressure" is used in this specification, it is to be understood as "standpipe pressure", and vice versa. A pressure sensor is typically provided in the standpipe from which the pump pressure/standpipe pressure can be measured.

As is also well known to the skilled person, one or more rig pumps may be provided. For example, a plurality of rig pumps may be connected to a common manifold which pumps drilling fluid through the standpipe and into the drill pipe. Thus, where "pump pressure" is referred to, this may mean the pressure produced by a single pump, or a plurality of pumps.

It will be appreciated that the method of the first aspect described above (and of embodiments described below) may be repeated over time. For example, the steps of receiving a measurement, comparing the measurement, receiving a pump pressure value, comparing the pump pressure value and establishing whether an influx and/or establishing whether a loss may have occurred may be repeated continuously whilst drilling takes place, thereby monitoring for influx and/or loss events over a period of time.

As set out above, the method establishes whether an influx event and/or establishes whether a loss event may have occurred. This step of establishing may utilise alarm conditions. Thus, preferably, the step of establishing comprises utilising the deviated measurement value to determine if a first influx alarm condition indicative of an influx event is satisfied and utilising the deviated pump pressure value to determine if a second influx alarm condition indicative of an influx event is satisfied. By a condition being "satisfied", it will be readily understood that this means the condition is met or fulfilled. The term "alarm condition" is thus used to describe a condition, which, if met or fulfilled, suggests that an influx or a loss may have occurred. The condition can therefore be considered as a requirement necessary for an influx or loss to be indicated. The alarm condition(s) may be threshold conditions, wherein the condition is met if a particular value is greater than, or less than, a threshold. In other words, the condition is a requirement that a particular value is greater than or less than a threshold for an influx, or a loss, to be indicated. "Condition" may alternatively be termed "criterion".

Alternatively or additionally, the method may further comprise utilising the deviated measurement value to determine if a first loss alarm condition indicative of a loss event is satisfied, and utilising the deviated pump pressure value to determine if a second loss alarm condition indicative of a loss event is satisfied.

The use of the terms "first", "second" and "third"" as used herein are not intended to indicate any preference or priority, rather they are used merely as ways to distinguish different measurements and alarm conditions. "First" relates to the measurement value (flow out rate or active volume), "second" relates to pump pressure and "third" (described later) relates to active volume in the case that "first" relates to flow out rate. Thus, a "first influx alarm condition" is an influx alarm condition for flow out rate or active volume, a "second influx alarm condition" is an influx alarm condition for pump pressure, etc.

As mentioned above, the alarm condition(s) may be threshold conditions, wherein the condition is met if a particular value is greater than, or less than, a threshold. In this way, the alarm conditions may be considered as each comprising a threshold condition. Thus, thresholds may be provided for the measurement value and pump pressure, against which these values may be compared.

Thus, in one embodiment, the step of utilising the deviated pump pressure value to determine if a second influx alarm condition is satisfied comprises: comparing the pump pressure value to a second influx alarm threshold; and if the pump pressure value is greater than the second influx alarm threshold, determining that the second influx alarm condition is satisfied. The second influx alarm threshold is a threshold value for the pump pressure, above which is suggestive that an influx may have occurred.

Furthermore, in one embodiment the step of utilising the deviated pump pressure value to determine if a second loss alarm condition is satisfied comprises: comparing the pump pressure value to a second loss alarm threshold; and if the pump pressure value is less than the second loss alarm threshold, determining that the second loss alarm condition is satisfied. The second loss alarm threshold is a threshold value for the pump pressure, below which is suggestive that a loss may have occurred.

However, in other embodiments, pump pressure is converted to a gain/loss volume, and this gain/loss volume is compared to a threshold. In such embodiments, the step of utilising the deviated pump pressure value to determine if a second influx alarm condition is satisfied preferably comprises determining a pump pressure gain/loss volume based on the deviated pump pressure value. A gain/loss volume is a volume associated with a potential gain/loss event, thus the pump pressure gain/loss volume is the volume determined using pump pressure measurements associated with a potential gain/loss event. Gain is another term for influx, but gain/loss volume is referred to here as is normal in the art. The skilled person would readily appreciate how to determine the pump pressure gain/loss volume, which is described in more detail later and examples are given in relation to the description of the drawings. For example, the deviated pump pressure value may be converted into a corresponding gain/loss flow out which is then accumulated into a corresponding gain/loss volume as per the later equations.

This pump pressure gain/loss volume is then compared to a second influx volume alarm threshold. The second influx volume alarm threshold is an alarm threshold for pump pressure gain/loss volume, above which is suggestive of an influx, and below which is not suggestive of an influx. Thus, if the pump pressure gain/loss volume is greater than the second influx volume alarm threshold, the method determines that the second influx alarm condition is satisfied. In other words, this is suggestive of an influx. It is later described how this affects the establishment by the method of whether an influx may have occurred.

Instead of, or in addition to, utilising the deviated pump pressure value to determine if a second influx volume alarm condition is satisfied, the method may utilise the deviated pump pressure value to determine if a second loss volume alarm condition is satisfied. This may comprise determining a pump pressure gain/loss volume based on the deviated pump pressure value and comparing the pump pressure gain/loss volume to a second loss volume alarm threshold. If the pump pressure gain/loss volume is less than the second loss volume alarm threshold, the method determines that the second loss alarm condition is satisfied.

In the case that the selected measurement (measurement of the selected variable) is flow out rate, the step of utilising the deviated measurement value to determine if a first influx alarm condition is satisfied may comprise: comparing the flow out rate to a first influx alarm threshold; and if the flow out rate is greater than the first influx alarm threshold, determining that the first influx alarm condition is satisfied. The first influx alarm threshold is a threshold value for the flow out rate, above which is suggestive that an influx may have occurred.

Furthermore, the step of utilising the deviated measurement value to determine if a first loss alarm condition is satisfied may comprise: comparing the flow out rate to a first loss alarm threshold; and if the flow out rate is less than the first loss alarm threshold, determining that the first loss alarm condition is satisfied. The first loss alarm threshold is a threshold value for the flow out rate, below which is suggestive that a loss may have occurred.

However, in other embodiments, flow out rate is converted to a gain/loss volume, and this gain/loss volume is compared to a threshold. In such embodiments, the step of utilising the deviated measurement value (flow out rate) to determine if a first influx alarm condition is satisfied may comprise: determining a flow out gain/loss volume based on the deviated measurement value; comparing the flow out gain/loss volume to a first influx volume alarm threshold; and if the flow out gain/loss volume is less than the first influx volume alarm threshold, determining that the first influx alarm condition is satisfied. The first influx volume alarm threshold is a threshold value for the volume corresponding to the flow out, above which is suggestive that an influx may have occurred.

Furthermore, in the case that the measurement is flow out rate, the step of utilising the deviated measurement value to determine if a first loss alarm condition is satisfied may comprise: determining a flow out gain/loss volume based on the deviated measurement value; comparing the flow out gain/loss volume to a first loss volume alarm threshold; and if the flow out gain/loss volume is less than the first loss volume alarm threshold, determining that the first loss alarm condition is satisfied. The first loss volume alarm threshold is a threshold value for the volume corresponding to the flow out, below which is suggestive that a loss may have occurred.

The skilled person would readily appreciate how to determine the flow out gain/loss volume, which is described in more detail later and examples are given in relation to the description of the drawings.

In the alternative case that the measurement is active volume, the step of utilising the deviated measurement value to determine if a first influx alarm condition is satisfied may comprise: comparing the active volume to a first influx alarm threshold; and if the active volume is greater than the first influx alarm threshold, determining that the first influx alarm condition is satisfied.

Furthermore, if the measurement is active volume, the step of utilising the deviated measurement value to determine if a first loss alarm condition is satisfied may comprise: comparing the active volume to a first loss alarm threshold; and if the active volume is less than the first loss alarm threshold, determining that the first loss alarm condition is satisfied.

The pump pressure gain/loss volume value may be found by first calculating a pressure based output gain/loss flow rate value by multiplying the deviated pump pressure value with a given constant, and then accumulating the pressure based gain/loss flow rate value to a pressure based gain/loss volume.

Through determining gain/loss volumes based on the deviated measurement and pump pressure values, the first loss alarm threshold may be set to be equal to the second loss alarm threshold. In this way, the same threshold value can be used to determine whether the first and second loss alarm conditions have been satisfied, providing for a simple method of determining whether each alarm condition has been met. The same principle applies to the influx alarm thresholds. By converting to volumes simplifies the alarm logic, since, instead of dealing with flow out rate, pump pressure and active volume values, one is dealing only with volume values (gain/loss volume for pump pressure, gain/loss volume for flow out rate, active volume). Hence, it is possible for the same alarm threshold value, a volume value, to be used for one or more of flow out rate, pump pressure and active volume.

The skilled person would readily be able to select appropriate threshold values for the different measurements/pump pressure (different variables) depending on the particular situation.

It will be appreciated that the measurements of flow out rate and/or active volume, and pump pressure, can be made by any suitable means. Typically sensors that make these measurements are already provided in well systems so no new sensors are needed, however new sensors could be provided if necessary. A flow out sensor may be a simple device such as a paddle/flap.

As would be well understood by those skilled in the art, active volume may be determined from sensor(s) in the pit(s), for example level sensors. Active volume may be the sum of the pit volumes. These pits are typically located 50+ metres away from the top of the well/riser.

As also would be well understood by those skilled in the art, a sensor for measuring flow out may typically be located a few metres away from the top of the well/riser/annulus along a flow line towards the trip tank.

As would further be well understood, a pressure sensor may typically be provided in the standpipe from which pump pressure is determined. The pressure in the standpipe may be taken to be the pump pressure as is well known in the art.

It is self-evident that such sensors for providing the measurements for use in aspects and embodiments of the invention are not therefore located in an annulus of the wellbore or in a marine riser.

In the embodiments described above, pump pressure is evaluated together with flow out rate or active volume. However, in other embodiments, all of pump pressure, flow out rate and active volume may be evaluated and used in establishing whether an influx and/or establishing whether a loss may have occurred. Therefore, in the case that the measurement is flow out rate, the method may further additionally comprise: receiving an active volume measurement of fluid entering/leaving the well bore; comparing the active volume with an expected value for the active volume to provide a deviated active volume; wherein the step of establishing whether an influx event and/or establishing whether a loss event may have occurred is further based on the deviated active volume. In other words, three measurements are made: flow out rate, active volume and pump pressure. All three of these independent indicators are used in establishing whether an influx event and/or establishing whether a loss event may have occurred. Thus use of pump pressure alongside flow out rate and active volume is particularly useful.

The method may then further comprise: utilising the deviated active volume to determine if a third influx alarm condition indicative of an influx event is satisfied; and/or utilising the deviated active volume to determine if a third loss alarm condition indicative of a loss event is satisfied.

The step of utilising the deviated active volume to determine if a third influx alarm condition is satisfied may comprise: comparing the active volume to a third influx alarm threshold; and if the active volume is greater than the third influx alarm threshold, determining that the third influx alarm condition is satisfied.

The step of utilising the deviated active volume to determine if a third loss alarm condition is satisfied may comprise: comparing the active volume to a third loss alarm threshold; and if the active volume is less than the third loss alarm threshold, determining that the third loss alarm condition is satisfied.

In the case that only first and second influx/loss alarm conditions are evaluated (i.e. only pump pressure and one of flow out rate/active volume are measured), the method may comprise determining whether both of the first and second influx alarm conditions are satisfied, and if they are, establishing that an influx event may have occurred. Thus, in this embodiment both alarm conditions must be met before it is established that an influx may have occurred.

Furthermore, the method may comprise determining whether both of the first and second loss alarm conditions are satisfied, and if they are, establishing that a loss event may have occurred. Thus, in this embodiment, both alarm conditions must be met before it is established that a loss may have occurred.

In the case that first, second and third influx/loss alarm conditions are evaluated, i.e. all of pump pressure, flow out rate and active volume are measured, the method may further comprise: determining whether one or two or three out of the first, second and third influx alarm conditions are satisfied, and if they are, establishing that an influx event may have occurred; but most preferably determining whether at least two out of three of the first, second and third influx alarm conditions are satisfied, and if they are, establishing that an influx event may have occurred.

Moreover, in the case that first, second and third influx/loss alarm conditions are evaluated, i.e. all of pump pressure, flow out rate and active volume are measured, the method may comprise determining whether one or two or three out of the first, second and third loss alarm conditions are satisfied, and if they are, establishing that a loss event may have occurred; but most preferably determining whether at least two out of three of the first, second and third loss alarm conditions are satisfied, and if they are, establishing that a loss event may have occurred.

The requirement for at least two out of the three of the alarm conditions to be met in order to establish that an influx/loss has occurred is sometimes referred to as "2/3 voting". This provides much more reliable results than if an influx/loss was established on the basis of only one alarm condition. The likelihood of false alarms being raised is reduced.

Prior to the step of comparing the measurement with an expected value for the measurement to provide a deviated measurement value, the method may comprise determining the expected value for the measurement. It will be appreciated that determining in this scenario includes estimating. The expected value may be estimated from a model (e.g. a mathematical model, such as those described later in this specification). The expected value may be estimated utilising measured flow in rate data and/or bit depth data and/or historical measurement data.

Alternatively or additionally, prior to the step of comparing the pump pressure value with an expected pump pressure value to provide a deviated pump pressure value; the method may comprise determining the expected pump pressure value. Again, the expected value may be estimated from a model. The expected value may be estimated utilising measured flow in rate data and/or bit depth data and/or historical pump pressure data.

The step of determining the expected value for the measurement may be based on fitting model parameters to historical data, so that the expected values track historical measurement data. The step of determining the expected pump pressure value may be based on fitting model parameters to historical data, so that the expected values track historical measurement data. Adaptive models may be used, in which model parameters are adjusted (e.g. trained) in real time to fit the data observed, as described in more detail later in this specification.

In this way, the expected values can be updated based on the conditions at the wellbore, resulting in a higher detection probability and lower false alarm rate. The skilled person would recognise that the expected values could be determined in various ways. Suitable methods are provided later in the specification so will not be described further here.

Utilising a model in this way to estimate the expected values can provide a reliable, accurate estimate which could not be achieved for example by any kind of mere visual observation.

In preferred embodiments, the received measurement and/or measured pump pressure are pre-processed prior to their comparison with the expected values for the measurement and/or pump pressure. This removes outliers or spikes from the data set to provide more reliable data with which to perform the method. As such it can be established with greater certainty that an influx or loss event may have occurred. The skilled person would readily appreciate how to pre-process the data in a suitable fashion.

The method may further comprise raising an alarm (generating an alarm) if it is established that an influx or loss event may have occurred. The operator may then be alerted to a potential influx or loss event and can respond as required. For example, a visual or aural indicator may be provided. The method may comprise writing in a database that it is established that an influx event or a loss event may have occurred. The method may also comprise writing in the database at least some of the measured and determined values, measurements, volumes, pump pressures and flow out rates.

The methods of "monitoring for influx and/or loss events" will be readily understood by the skilled person as methods which check or look for such events. By "establishing" whether an influx or whether a loss may have occurred, means to decide whether such events may have occurred.

Alternatively, the methods could be described as methods of detecting influx and/or loss events at a wellbore, with the final step comprising detecting whether an influx event or a loss event has occurred. But, if described in such a way, this would not be intended to imply that the method provides completely accurate detection. Whilst the method of the invention is highly effective in establishing whether an influx or loss has occurred, false positives or false negatives remain a possibility, as with any method.

The invention further extends to a system configured to carry out any of the above described methods. This is seen as an invention in its own right, and thus, according to a second aspect, the invention provides a system configured to monitor for influx and/or loss events in a wellbore, comprising: a sensor for obtaining a measurement relating to fluid entering or leaving the wellbore, wherein the measurement is selected from flow out rate and active volume; a sensor for obtaining a measurement of pump pressure; and a processor configured to: compare the measurement with an expected value for the measurement to provide a deviated measurement value; compare the measured pump pressure value with an expected pump pressure value to provide a deviated pump pressure value; and establish whether an influx event and/or establish whether a loss event may have occurred based on at least the deviated measurement value and deviated pump pressure value.

The sensor(s) and processor may normally be installed at the rig or wellbore. As such, no modification of the rig or installation of hardware may be required. The sensor(s) may include an active volume sensor and/or a flow out rate sensor, and a pump pressure sensor.

The system may further comprise an alarm/alerting means, such as a visual or aural indicator. This enables the operator to be notified if an influx or loss condition may have occurred. The operator can then take appropriate action, depending on whether an influx or loss event is expected to have occurred. The processor may be configured to write in a database that it is established that an influx event or a loss event may have occurred.

It will be well appreciated that the processor may be further configured to carry out the numerous optional and preferred features of the method of the first aspect which are described above.

According to a third aspect, the invention provides a method of monitoring for influx and/or loss events in a wellbore, comprising: receiving at least three independent measurements relating to fluid entering or leaving the wellbore; comparing at least two of these measurements with an expected value for the measurement to provide at least two respective deviated measurement values; establishing whether an influx event and/or establishing whether a loss event may have occurred based on these at least two deviated measurement values.

It will be appreciated that comparing at least two of the measurements with an expected value for the measurement means comparing each of the at least two measurements with a respective expected value for that measurement. So, a measurement is compared with an expected value for that measurement, and another measurement is compared with an expected value for that measurement.

The method may comprise utilising one of the deviated measurement values to determine if an influx alarm condition indicative of an influx event is satisfied and utilising the other deviated measurement value to determine if a further influx alarm condition indicative of an influx event is satisfied. Additionally or alternatively, the method may comprise utilising one of the deviated measurement values to determine if a loss alarm condition indicative of a loss event is satisfied and utilising the other deviated measurement value to determine if a further loss alarm condition indicative of a loss event is satisfied.

In one embodiment, determining if the influx alarm condition or the further influx alarm condition is satisfied comprises comparing each deviated measurement value or a value derived from the deviated measurement value with a respective influx alarm threshold value; and if the deviated measurement value or value derived from the deviated measurement value is greater than the respective influx alarm threshold value, it is determined that the respective influx alarm condition is satisfied. It will be appreciated by that comparing each deviated measurement value or a value derived from the deviated measurement value with a "respective" influx alarm threshold value means to compare one deviated measurement value or a value derived therefrom with an influx alarm threshold value for that measurement value, and to compare the other deviated measurement value or a value derived therefrom with an influx alarm threshold value for that other measurement value. This normal meaning of "respective" is also intended where used elsewhere.

In one embodiment, determining if the loss alarm condition or the further loss alarm condition is satisfied comprises comparing each deviated measurement value or a value derived from the deviated measurement value with a respective loss alarm threshold value; and if the deviated measurement value or value derived from the deviated measurement value is less than the respective loss alarm threshold value, it is determined that the respective loss alarm condition is satisfied. A "value derived from the deviated measurement value" may be, for example, in the case of flow out rate a gain/loss volume corresponding to the flow out rate. Similarly, in the case of pump pressure, it may be a gain/loss volume corresponding to the pump pressure. This is as described above in relation to the first aspect.

If both alarm influx conditions are satisfied it may be established that an influx event may have occurred. Furthermore, if both loss alarm conditions are satisfied it may be established that a loss event may have occurred. It may therefore be considered that the result of one alarm condition is used to confirm the other. In other words, if one alarm condition is satisfied, and the other alarm condition is also satisfied, the fact that the latter is satisfied confirms the result of the former, therefore providing good accuracy in establishing whether a loss or influx event may have occurred.

The method may further comprise comparing the third (i.e. the measurement not already compared in the third aspect above; the measurements already compared in the first aspect above may be considered as first and second measurements) of the at least three measurements with an expected value for the measurement to provide an additional deviated measurement value, wherein establishing whether an influx event and/or establishing whether a loss event may have occurred is further based on the additional deviated measurement value. The method may comprise utilising the additional deviated measurement value to determine if an additional influx alarm condition indicative of an influx event is satisfied and/or if an additional loss alarm condition indicative of a loss event is satisfied.

Utilising the additional deviated measurement value to determine if the additional influx alarm condition indicative of an influx event is satisfied may comprise: comparing the additional deviated measurement value or a value derived from the additional deviated measurement value with an additional influx alarm threshold value; and if the additional deviated measurement value or value derived from the additional deviated measurement value is greater than the additional influx alarm threshold value, it is determined that the additional influx alarm condition is satisfied.

Utilising the additional deviated measurement value to determine if the additional loss alarm condition indicative of a loss event is satisfied may comprise: comparing the additional deviated measurement value or a value derived from the additional deviated measurement value with an additional loss alarm threshold value; and if the additional deviated measurement value or value derived from the additional deviated measurement value is less than the additional loss alarm threshold value, it is determined that the additional loss alarm condition is satisfied.

In the case that an additional deviated measurement value is calculated from the third of the at least three measurements and influx and/or loss alarm conditions are evaluated for this additional deviated measurement value, so that three alarm conditions have been evaluated for influx and/or three alarm conditions have been evaluated for loss, the method may comprise determining whether at least two out of the at least three influx alarm conditions are satisfied, and if they are, establishing that an influx event may have occurred; and/or determining whether at least two out of the at least three loss alarm conditions are satisfied, and if they are, establishing that a loss event may have occurred.

It will be appreciated that the terms "further" and "additional" used herein in relation to e.g. the alarm conditions are used in order to distinguish them from each other.

In some embodiments it is envisaged that the at least three independent measurements may be measurements of the same variable. For example, three measurements of flow out rate may be used, each from a different flow out rate sensor, so that the measurements are independent of each other. However, in the most preferred embodiments, each of the measurements are measurements of different variables, for example one of the independent measurements may be a measurement of flow out rate, another of the independent measurements is of active volume and another may be pump pressure. Although in the third aspect, unlike the first aspect, it is not essential that pump pressure is measured, most preferably, one of the measurements is of pump pressure.

It will be well appreciated that measurements of flow out rate, active volume and pump pressure are measurements relating to a fluid entering or leaving the wellbore. Pump pressure increases with increasing flow out rate, and is thus clearly related to the fluid entering or leaving the wellbore.

If it is established that an influx event or a loss event may have occurred, the method further comprises raising an alarm, preferably by a visual or aural indicator. Thus, an alarm is communicated to the driller, who can take the necessary action. Furthermore, measurements, measured values, determined values, volumes, pump pressures and flow out rates may be communicated, depending on whether these are used in the particular embodiment, to the driller, so that the driller can identify not just that there is a problem, but which measurements indicate an influx or a loss event. Such measurements, measured values, determined values, volumes, pump pressures and flow out rates may be written to a database, depending on whether these are used in the particular embodiment. Moreover, it may be written in a database that it is established that an influx event or a loss event may have occurred.

It will be well appreciated that features described above in relation to the first aspect may also be applicable to the third aspect. For example, expected values may be estimated from a model. Thus, prior to the step of comparing at least two of the measurements with a respective value for that measurement, the method may comprise determining the expected value for the or each measurement, preferably using a model, such as an adaptive model. Features relating to such models are described elsewhere in this specification and so will not be repeated again here.

The three independent measurements in the third aspect may be termed first second and third measurements, or measurements A, B and C. The third aspect may therefore alternatively be written as: a method of monitoring for influx and/or loss events in a wellbore, comprising: receiving at least first, second and third measurements relating to fluid entering or leaving the wellbore; comparing at least the first and second measurements with an expected value for the first and second measurements respectively to provide at least first and second deviated measurement values; and establishing whether an influx event and/or establishing whether a loss event may have occurred based on these at least first and second measurement values. "First", "second" and "third" are only used as a means to distinguish the measurements from each other, and do not mean that one measurement is made before the other, or is preferable to the other. Moreover, the use of "first, "second" and "third" here in relation to the third aspect of the invention is different to the way these terms are used in relation to the first aspect.

Another way of writing the third aspect is: a method of monitoring for influx and/or loss events in a wellbore, comprising: receiving at least three independent measurements relating to fluid entering or leaving the wellbore: measurement A, measurement B and measurement C; comparing at least measurement A and measurement B with an expected value for measurement A and measurement B respectively to provide at least a deviated measurement A value and a deviated measurement B value; and establishing whether an influx event and/or establishing whether a loss event may have occurred based on these at least deviated measurement A and deviated measurement B values.

The preferred features of the third aspect described above are equally applicable to these alternative wordings as will be appreciated by the skilled person, so it is considered unnecessary to repeat the preferred features using the alternative wordings.

The invention further extends to a system configured to carry out any of the above described methods relating to the third aspect. This is seen as an invention in its own right, and thus, according to a fourth aspect, the invention provides a system configured to monitor for influx and/or loss events in a wellbore, comprising: at least three sensors, each arranged to obtain an independent measurement relating to fluid entering or leaving the wellbore; and a processor configured to: compare at least of the measurements with an expected value for the measurement to provide at least two respective deviated measurement values; and establish whether an influx event and/or establish whether a loss event may have occurred based on these at least two deviated measurement values.

The system may further comprise: a visual or aural indicator arranged to raise an alarm if it is established that an influx event or a loss event may have occurred; and/or wherein the processor is configured to write in a database that it is established that an influx event or a loss event may have occurred.

In the various methods of aspects and embodiments of the invention described above, it will be appreciated that (as is described elsewhere in this specification) prior to steps of receiving measurements, the method may further comprise making (obtaining) one or more of the measurements. The measurement(s) may be made (obtained) using sensor(s). For example, as discussed elsewhere, a flow out rate sensor may provide a flow out rate measurement. Therefore where flow out rate is used, the method may comprise measuring flow out rate using a flow out rate sensor. An active volume sensor such as a level sensor may provide an active volume measurement or data from which active volume can be determined. Therefore where active volume is used, the method may comprise measuring active volume utilising a sensor, e.g. a sensor in the pit. Where there are multiple pits, the method may comprise measuring active volume using a sensor in each pit, with the active volume measurement used being the sum of the active volumes of the individual pits. A pressure sensor, for example located in the standpipe, may provide a pump pressure measurement. Therefore, the method may comprise measuring pump pressure using a pressure sensor preferably located in the standpipe.

The methods and systems of the invention are clearly applicable to both onshore and offshore applications. For example they can be used in all kinds of drilling rigs including onshore and fixed platforms standing on the seabed without a riser.

The methods and systems of the invention provide improved ways of establishing whether an influx or a loss may have occurred during drilling of a hydrocarbon well. Typically the methods are automated, e.g. the various steps are carried out by a processor, and indeed the systems of the invention specifically utilise a processor. Therefore the methods and systems of the invention avoid the need for an operator to manually detect influx/loss based on experience. Consequently, experienced personnel are not needed in order to detect influx/loss, so fewer experts are needed on-site, consequently simplifying matters and saving cost. Furthermore, the methods and systems of the invention can provide improved detection results over merely manual detection, particularly in the case of an inexperienced operator.

Moreover the methods and systems of the invention provide more accurate detection of influx/loss events than existing automated systems, through the use of pump pressure and/or the use of three independent measurements relating to the fluid entering or leaving the wellbore.

The integrated approach of embodiments of the invention, particularly through the use of pressure, flow out and active volume measurements, provides a highly improved way of detecting influx/loss.

It will be readily appreciated by the skilled person that the various optional and preferred features of embodiments of the invention described above may be applicable to all the various aspects of the invention discussed.

So that those skilled in the art to which the invention appertains will readily understand how to make and use the devices and methods of the invention without undue experimentation, embodiments thereof will be described in detail herein below by way of example only and with reference to certain figures, wherein:

FIG. 1 schematically illustrates an exemplary embodiment of a system and method for monitoring for influx or loss events at a wellbore;

FIG. 2 schematically illustrates a wellbore and associated drilling apparatus;

Figure 1:
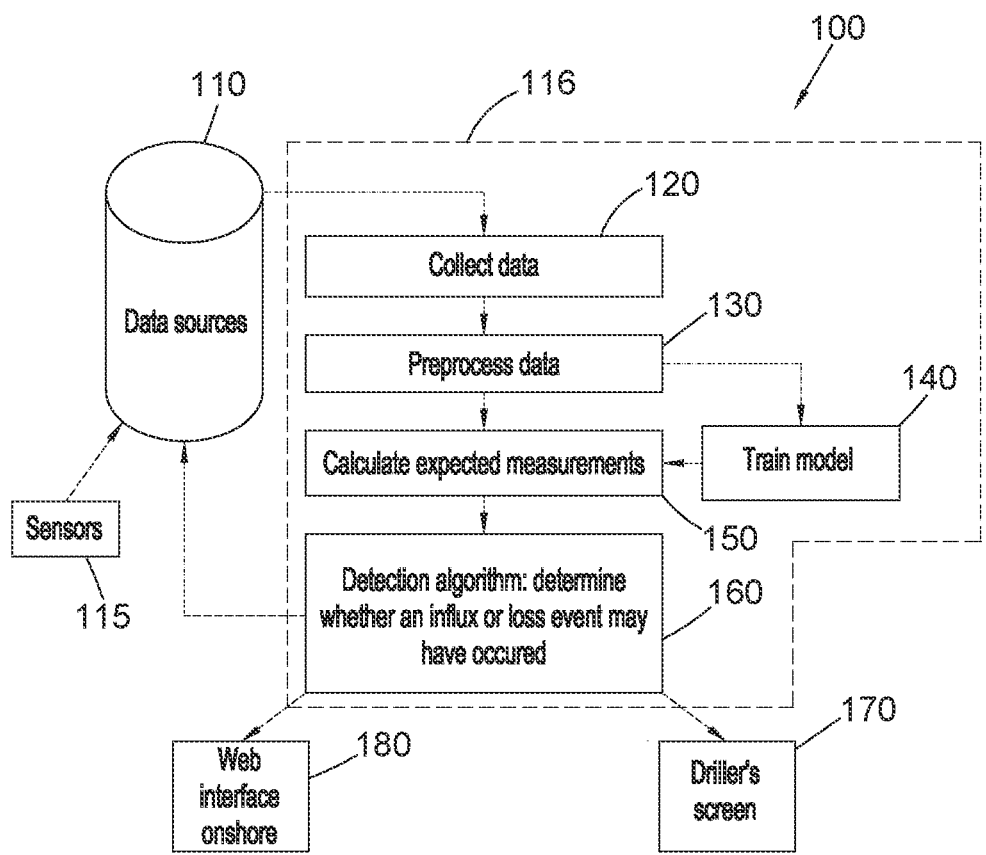

Reference will now be made to the drawings wherein like reference numerals identify similar structural features or aspects of the subject disclosure. For purposes of explanation and illustration, and not limitation, an illustrative view of an embodiment of a system for monitoring for an influx or loss event at a wellbore is shown in FIG. 1 and, the associated method, is designated generally by reference character 100. A wellbore and associated drilling apparatus 200 to which embodiments of the invention may be applied is shown in FIG. 2.

Figure 2:
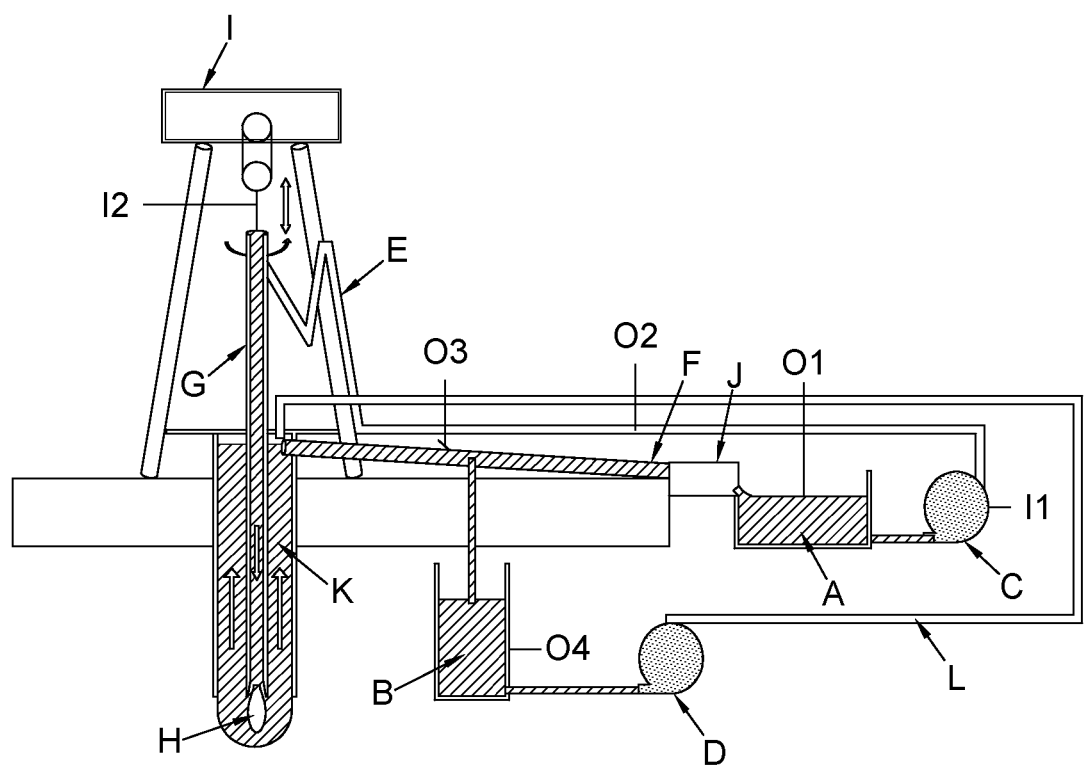

The wellbore and associated drilling apparatus 200 of FIG. 2 is a typical arrangement described briefly above in relation to the technical background. It comprises active pits A, trip tank B, rig pumps C, trip tank pump D, stand pipe E, flow line F, drill pipe G, drill bit H, top drive and draw works I, shale shaker J, annulus K and trip tank pipe L. The operation of such an apparatus is well known and has already been briefly described above and so will not be described further here. The flow in rate $I1$ can be measured, as can the bit depth $I2$, active volume $O1$, pump (standpipe) pressure $O2$ and flow out rate $O3$. Measurements of these quantities are used in embodiments of the invention for monitoring for influx and/or loss events.

Flow out rate is typically measured by a sensor located a few metres away from the top of the annulus K along flow line F as shown by $O3$. Active volume is typically measured using a level sensor in the pit A as shown by $O1$. Active volume may be calculated as the sum of multiple pit volumes where multiple pits are present.

As the skilled person would readily appreciate, the standpipe is a pipe between the pump and the drill string (the drill string comprising the drill pipe and the drill bit). A pressure sensor is typically provided in the standpipe from which the standpipe pressure, which is taken to be the pump pressure, is measured. The terms "standpipe pressure" and "pump pressure" both describe the pressure downstream the pump and upstream the drill pipe.

It will be appreciated from the above that therefore the sensors providing the measurements used in embodiments of the invention are not located in the annulus of the wellbore, or along a marine riser.

Referring now to FIG. 1, the wellbore or drilling rig is provided with one or more sensors 115 for obtaining measurements associated with a fluid entering or leaving the wellbore. These measurements may include, but are not limited to, flow out rate $O1$, active volume $O1$ and pump pressure $O2$. Flow out rate, active volume and pump pressure may be considered as variables of which measurements are made. Sensors 115 may also measure flow in rate $I1$ and bit depth $I2$. Sensors 115 for making such measurements are normally conventionally present at the wellbore or on the rig, since such measurements are used for other reasons, but if appropriate sensors are not provided, they may be specially installed for providing the required measurements. The readings taken by the sensor(s) may be stored in a drilling control system or database which forms a data source 110. The data may be stored locally, i.e. at the rig, or remotely. The types of sensors and how these can be used to collect data are well known to the skilled person.

A processor 116 is provided to carry out a method 100 comprising the various steps 120, 130, 140, 150 and 160, according to embodiments of the invention. The processor 116 may be located on the rig or remotely. The processor 116 may form part of a computer system.

The first step carried out by the processor 116 is to receive or collect data (step 120), i.e. the measurements (measurements of variables) associated with a fluid entering or leaving the wellbore, directly from the sensor(s) 115 or from the data source 110.

The data (i.e. the measurements associated with a fluid entering or leaving the wellbore) collected at step 120 from the data source 110 may be pre-processed and cleaned prior to processing (step 130). For example, pre-processing may involve removing outliers or spikes from the data set, filtering the data, or aligning time stamps.

The method 100 further comprises comparing the received measurements of active volume $O1$, pump pressure O2 and/or flow out rate O3 with expected value(s) for the same measurements to provide deviated measurement values. In order to do this, the expected values (expected measurements) must first be calculated (step 150). The expected values may be determined using a model. In the embodiment as described below, it will be seen that in order to calculate the expected measurements for the flow out, pump pressure and active volume, simple dynamic input-output models are used with a few model parameters. To avoid the need for configuration and model calibration, and to allow for changes in the model parameters, adaptive models are used, where the model parameters are adjusted in real time to fit the data observed. As the skilled person will understand, a balance is struck between adjusting the parameters enough to track the data and avoid false alarms, but not so much that true influx and loss events are hidden.

At step 140, the model parameters are trained continuously to fit the received data. The skilled person would readily appreciate that there are various different ways that expected values may be calculated, however, as an example, the expected measurements and model parameters may be determined as follows:

1) When the drill string is moved into or out of the well with a velocity $v_{pipe}$, then the compensated flow in rate including steel volume is given by:

$$q_{comp} = q_{in} + A_p \cdot v_{pipe}$$

where the pipe velocity is the time derivative of the bit depth, the bit depth may for example be calculated from the block height:

$$v_{pipe} = \frac{d}{dt} h_{bit},$$

and $A_p$ is a tunable model parameter representing the cross section area of steel pipe moving in or out of the well bore, which will be adjusted to fit the measurements. When the bit is not moving, then the compensated flow in rate is equal to the pump flow rate ($q_{comp} = q_{in}$).

2) Calibration of flow out rate $q_{out}$ measurement to track the true flow out: estimate bias (offset) $k_{bias}$ and scale factor $k_{scale}$ in:

$$q_{out} = k_{scale} \cdot q_{meas} + k_{bias}$$

The bias is adjusted with pumps off (zero flow in rate) ($k_{bias}$=average($q_{meas}$), when $q_{in}$ is zero). The scale factor is adjusted after the flow out is steady after each pump start. ($k_{scale}$=-average(($q_{in}-k_{bias}$)/($q_{meas}$)), when $q_{in}$ is near constant at drilling circulation rate)

3) The expected flow out rate $q_{exp}$ is modeled as a lowpass filtered and delayed function of the compensated flow in rate, and can then be found using the compensated flow in rate and calibrated flow out values as found in steps 1 and 2 above, as follows:

$$q_{exp} = \frac{q_{comp}(t - \tau_d)}{1 + \tau_c s}$$

The parameter values time delay $\tau_d$ and time constant $\tau_c$ are found during pump stops and pump starts to best fit the calibrated measurement of calibrated flow out rate $q_{out}$ (s is the Laplace operator).

The parameter values are found using a gradient search for the combination that minimizes the mean error norm:

$$e_q = \Sigma(q_{out} - q_{exp})^2$$

4) Expected pump pressure $p_{exp}$: this is modeled as a stepwise linear function of the flow in rate, by estimating parameter values in a stepwise linear model for high and low flow in rate:

$$p_{exp} = p_{0inj} + \begin{cases} b_1 \cdot q_{comp} + p_{01} & \text{for} \quad 0 < q_{in} < q_{pivot,1} \\ \vdots & \vdots \\ b_K \cdot q_{comp} + p_{0K} & \text{for} \quad q_{pivot,K-1} < q_{in} < q_{pivot,K} \end{cases}$$

where $p_{0inj}$ is an injection term. The idea is to compensate for slow variations in pressure due to, for example, the length of the well and the weight of cuttings in the annulus. The parameters $b_i$ and $p_{0i}$ are adjusted to best fit the measured pump pressure when the flow in rate is near constant. The parameters are found using a gradient search for the combination that minimizes the mean error norm:

$$e_p = \Sigma(p_{meas} - p_{exp})^2$$

5) Expected active volume $V_{exp}$: this and the mud volume in flowline $V_S$ are modeled with a simple linear dynamic model driven by the compensated flow in rate, as follows. Estimate parameter values $k_{vol}$, $k_{flow}$ and delay $\tau_V$ in linear dynamic model of mud volume in flowline $V_S$ and active $V_{exp}$:

$$q_{fl}(t) = k_{vol} V_{fl}(t) - k_{flow} q_{comp}(t)$$

$$\frac{d}{dt} V_{fl}(t) = q_{comp}(t - \tau_V) - q_{fl}(t)$$

$$\frac{d}{dt} V_{exp}(t) = q_{fl}(t) - q_{comp}(t - \tau_V) + q_{loss}(t)$$

$$q_{loss}(t) = k_{inj1} \xi(t) + k_{inj2} \int \xi(t)$$

$$\xi(t) = V_{meas}(t) - V_{exp}(t)$$

$q_{fl}$ is an estimate of the flow rate out of the flow line and into the active volume.

The compensated flow in rate $q_{comp}$ is flow in rate plus an additional term representing change of steel volume in/out of the well as the drill pipe is moved down/up.

The time delay $\tau_V$ along with the parameters $K_{vol}$ and $K_{flow}$ are found to best match the increase in active volume measured after a pump stop.

The parameter value $k_{vol}$ is found from the last measured flow backs, i.e. how much the measured active volume increases, when the pump is stopped, based on the equation:

$$k_{vol} = \frac{V_{meas}(q_{in} = 0) - V_{meas}(q_{in} = q_{drilling})}{q_{drilling}}$$

The parameter value $k_{flow}$ is found during steady circulation ($k_{flow}$=-average(($q_{in}-k_{vol}V_{fl}$)/$q_{in}$)). The variable $q_{loss}$ is an estimate of mud lost on the shakers and possibly downhole.

The loss rate is estimated by injection to make the estimated active volume follow the measured volume. However, there are constraints on how much injection is allowed, so that large influxes and losses not will be hidden by this term. The parameters $k_{inj1}$ and $k_{inj2}$ may be constants. An additional volume correction term $V_{corr}$ is calculated from previous deviations during pumps off events $$V_{corr}(t) = g(q_c(t-t_1), \ldots, q_c(t-t_L))$$

$$\xi_{corr}(t) = \xi(t) - V_{corr}(t)$$

Here g(•) is a nonlinear function with model parameters trained to minimize the error norm $$e_v = \Sigma \xi_{corr}(t)^2$$

The bit depth can be used together with the hole depth to determine if they are on bottom drilling.

Once the expected measurements have been calculated (step 150), a "detection algorithm" (160) determines (establishes) whether an influx or loss event may have occurred. This involves the following steps. Firstly, each received measurement is compared with the corresponding expected measurement to generate a "deviated measurement value". These may be calculated according to the equations below. Then, estimated influx/loss volumes may be calculated by accumulating the deviated measurement values.

In the equations below, $q_{IOflow}$ is the deviated flow out rate value, which is determined as the difference between the measured flow out rate and the expected flow out rate. This may be found as: $q_{IOflow} = q_{meas} - q_{exp}$ However, the measured flow out may typically be in percent, and it will generally be more appropriate to utilise a flow out value in liters per minute. Therefore, more appropriately, $q_{IOflow}$ is based on the calibrated flow out measurement $q_{out}$:

$$q_{IOflow} = q_{out} - q_{exp}$$

The calculation of the calibrated flow out from the measured flow out is discussed above.

This deviated flow out rate value may be used directly in the subsequent determination of whether an alarm condition is satisfied, by means of comparison with an alarm threshold (as described later). Or, a further calculation may be carried out based on the $q_{IOflow}$ value, which is then used in the subsequent determination of whether an alarm condition is satisfied.

For example, the $q_{IOflow}$ value may be accumulated into a corresponding gain/loss volume $V_{IOflow}$, as given by the below equation:

$$V_{IOflow}(t + \Delta t) = V_{IOflow}(t) + \Delta t \cdot \left(-\frac{V_{IOflow}(t)}{T_{IOflow}} + \begin{cases} 0 & \text{if } |q_{IOflow}(t)| < q_{deadband} \\ q_{IOflow}(t) & \text{else} \end{cases}\right) \quad \text{Equation A}$$

It will be understood that a gain/loss volume means an influx/loss volume.

$V_{IOflow}$ is the influx/loss volume corresponding to deviated flow out rate. In other words, the volume corresponding to the difference between the measured and expected flow out measurements. A positive value may indicate an influx, a negative value may indicate a loss.

Thus, this accumulated value may then be used in the subsequent determination of whether an alarm condition is satisfied, by means of comparison of this gain/loss volume $V_{IOflow}$ with an alarm threshold for volume.

$q_{deadband}$ is a deadband flow rate. To avoid integrating up/accumulating sensor noise, $q_{IOflow}$ is small (smaller than $q_{deadband}$), then it is neglected, and the accumulated/integrated gain/loss volume estimate $V_{IOflow}$ is not updated.

$T_{IOflow}$ is a time constant used to suppress integration of noise. If this is small, then real influx and loss events may be hidden, while a high value might raise false alarms.

Similarly, $p_{IO}$ is the deviated pump pressure value, which is determined as the difference between the measured pump pressure and the expected pump pressure. This may be compared with an alarm threshold for pump pressure, or, a further calculation may be carried out on the $p_{IO}$ value, which is then used in the subsequent determination of whether an alarm condition is satisfied, by means of comparison with an alarm threshold. For example, the $p_{IO}$ value may be converted into a corresponding gain/loss flow out rate value $q_{IOpres}$, which again can be accumulated into a corresponding gain/loss volume $V_{IOpres}$, as given by the below equation. This accumulated value may then be used in the subsequent determination of whether an alarm condition is satisfied, by means of comparison of this $V_{IOpres}$ with an alarm threshold for volume.

$$p_{IO} = p_{meas} - p_{exp}$$

$$q_{IOpres} = k_{pres} p_{IO}$$

$$V_{IOpres}(t + \Delta t) = \left(1 - \frac{\Delta t}{T_{IOpres}}\right) V_{IOpres}(t) + \Delta t \cdot \begin{cases} 0 & \text{if } |q_{IOpres}(t)| < q_{deadband} \\ q_{IOpres}(t) & \text{else} \end{cases} \quad \text{Equation B}$$

$k_{pres}$ is the constant used to calculate an expected gain/loss flow rate from a deviated pressure. $T_{IOpres}$ is a time constant similar to $T_{IOflow}$.

$V_{IOpres}$ is the influx/loss volume corresponding to deviated pump pressure. In other words, the volume corresponding to the difference between the measured and expected pump pressure measurements. A positive value may indicate an influx, a negative value may indicate a loss.

It will be appreciated from the above equations that $q_{IOpres}$ is not an instant value, rather it is an aggregated value computed by taking the time integral of the difference between the measured pressure and the expected pressure, multiplied by a constant to get an assumed flow rate. Therefore, $V_{IOpres}$ which is calculated from $q_{IOpres}$, is also not an instant value. Consequently there may be a delay from when a large deviation between measured pressure and expected pressure is present, until a corresponding large value of $V_{IOpres}$ is evident. This can be seen later for example in the experimental data of FIGS. 4b and 4e.

Similarly, $V_{IOvol}$ is the deviated active volume value (i.e. the measurement is active volume), which is determined as the difference between the measured active volume and the expected active volume. This deviated active volume may be used directly in the subsequent determination of whether an alarm condition is satisfied, by means of comparison with an alarm threshold.

$$V_{IOvol} = V_{meas} - V_{exp} \quad \text{Equation C}$$

$V_{IOvol}$ is the influx/loss volume corresponding to deviated active volume. In other words, the volume that is the difference between the measured and expected flow out measurements. A positive value may indicate an influx, a negative value may indicate a loss.

The constant parameters $T_{IOflow}$, $q_{deadband}$, $k_{pres}$, $T_{IOpres}$ and $T_{IOvol}$ can be hard coded.

As described above, once a deviated measurement value is determined based on each measured and expected value, the deviated measurement value may be compared to an alarm threshold. The alarm threshold is essentially a threshold defining the limit of what is considered normal, and the point at which it can be considered with a certain confidence that a real influx or loss has occurred. An alarm threshold may be provided for flow out rate (e.g. a flow out rate alarm threshold), pump pressure (e.g. a pump pressure alarm threshold) and active volume (e.g. a volume alarm threshold). For all of these, a threshold will be provided for each of influx and loss.

Or, instead of comparing the deviated measurement value directly to an alarm threshold, a further calculation can be carried out such as determining the gain/loss volume such as by using the equations described above. This gain/loss volume is then compared to a volume alarm threshold. By converting deviated flow out rate and deviated pump pressure into gain/loss volumes, only volume alarm thresholds are needed (rather than also flow out and pump pressure thresholds). Moreover, the volume alarm threshold for each of $V_{IOflow}$, $V_{IOpres}$ and $V_{IOvol}$ can be the same, since these are all the same type of quantity.

The alarm threshold is essentially a threshold defining the limit of what is considered normal, and the point at which it can be considered with a certain confidence that a real influx or loss has occurred.

An alarm threshold may, for example, be provided for the gain/loss volume calculated from the flow out rate measurement. Similarly, an alarm threshold may be provided for the gain/loss volume calculated from the pump pressure measurement For both of these, a threshold will be provided for each of influx and loss, i.e. a volume alarm threshold for the gain/loss volume calculated from the flow out rate measurement indicative of influx and a volume alarm threshold for the gain/loss volume calculated from the flow out rate measurement indicative of loss; a volume alarm threshold for the gain/loss volume calculated from the pump pressure measurement indicative of influx and a volume alarm threshold for the gain/loss volume calculated from the pump pressure measurement indicative of loss.

The volume alarm threshold indicative of loss for each of flow out rate and pump pressure may be different or they may be the same. If they are the same, this simplifies calculations. The same applies to the thresholds indicative of influx. Similarly, the volume alarm threshold indicative of loss for active volume may be different to or the same as either or both of the volume alarm thresholds for flow out rate and pump pressure. The same applies to the thresholds indicative of influx.

Alarm conditions may be set such that if the deviated measurement value exceeds the relevant alarm threshold for influx, it is suggestive that an influx may have occurred. If the deviated measurement value is less than the relevant alarm threshold for loss, it is suggestive that a loss may have occurred. Loss alarm thresholds will be negative. Alarm thresholds may also vary over time, e.g. with model and measurement accuracy.

In one embodiment, pump pressure is measured, together with either flow out rate or active volume. There is an alarm condition for each of pump pressure and flow out rate or active volume, for each of loss and influx. If it is found that both alarm conditions for loss are satisfied, it is established that a loss may have occurred. If it is found that both alarm conditions for influx are satisfied, it is established that an influx may have occurred.

In another embodiment, all of pump pressure, flow out rate and active volume are measured. There is an alarm condition for each of these, and for each of loss and influx. If it is found that at least two out of the three alarm conditions for loss are satisfied, it is established that a loss may have occurred. If it is found that at least two out of the three alarm conditions for influx are satisfied, it is established that an influx may have occurred. In other words, if at least two out of three deviated measurement values (or gain/loss volume calculated from a deviated measurement value) exceed the relevant alarm threshold for influx (which will be a positive alarm threshold), it is established that an influx may have occurred. Or, if at least two out of three deviated measurement values (or gain/loss volume calculated from a deviated measurement value) are less than the alarm threshold for loss (which is a negative threshold), then it is established that a loss may have occurred.

In another embodiment, three independent measurements relating to fluid entering or leaving a well bore are made. There is an alarm condition for each of these, and for each of loss and influx. If it is found that at least two out of the three alarm conditions for loss are satisfied, it is established that a loss may have occurred. If it is found that at least two out of the three alarm conditions for influx are satisfied, it is established that an influx may have occurred. These measurements may all be of the same variable, e.g. flow out rate, or of two or more different variables.

If it is established that a loss or influx may have occurred, an alarm is raised (generated), for example by a visual or aural indicator. This could be a visual alert on the screen of a control terminal, or an audible warning. Thus, an alarm is communicated to the driller, who can take the necessary action. Furthermore, measurements, measured values, determined values, volumes, pump pressures and flow out rates may be communicated, depending on whether these are used in the particular embodiment, to the driller, so that the driller can identify not just that there is a problem, but where that problem might be. Such measurements, measured values, determined values, volumes, pump pressures and flow out rates may be written to a database, depending on whether these are used in the particular embodiment. Moreover, it may be written in a database that it is established that an influx event or a loss event may have occurred.

The following table gives the alarm conditions that must be satisfied for a certain alarm to be generated, according to an embodiment of the invention. Each "alarm type" is simply the name given to an alarm generated when two particular conditions are met. E.g. the first row gives the combination of two alarm conditions that must be satisfied for it to be established that a loss may have occurred, based on flow out rate and pump pressure measurements. The second row gives the combination of two alarm conditions that must be satisfied for it to be established that a loss may have occurred based on flow out rate and active volume measurements, etc.

| | Alarm type | Condition 1 | Condition 2 |
|---|---|---|---|
| 1. | Flow and pressure loss alarm | $V_{IOflow} < -V_{alarm}$ | $V_{IOpres} < -V_{alarm}$ |
| 2. | Flow and volume loss alarm | $V_{IOflow} < -V_{alarm}$ | $V_{IOvol} < -V_{alarm}$ |
| 3. | Volume and pressure loss alarm | $V_{IOvol} < -V_{alarm}$ | $V_{IOpres} < -V_{alarm}$ |
| 4. | Flow and pressure influx alarm | $V_{IOflow} > V_{alarm}$ | $V_{IOpres} > V_{alarm}$ |
| 5. | Flow and volume influx alarm | $V_{IOflow} > V_{alarm}$ | $V_{IOvol} > V_{alarm}$ |
| 6. | Volume and pressure influx alarm | $V_{IOvol} > V_{alarm}$ | $V_{IOpres} > V_{alarm}$ |

$V_{alarm}$ is a gain/loss volume alarm threshold, and is a threshold value with which the gain/loss volume calculated using the deviated measurement values is compared, to determine whether the alarm condition is satisfied.

In one embodiment, for loss alarms, $V_{alarm}$ is the same value in each of the above loss alarm conditions. In one embodiment, for influx alarms, $V_{alarm}$ is the same value in each of the above influx alarm conditions.

The absolute value of $V_{alarm}$ may in fact be the same for both the loss alarm and the influx alarm, for the same measurement, but for loss alarms the negative will be used.

Take the example where $V_{alarm}=1$ m$^3$:

If $V_{IOflow}<-1$ m$^3$, then condition 1 for alarm type 1 (loss) is satisfied

If $V_{IOflow}>1$ m$^3$, then condition 1 for alarm type 5 (influx) is satisfied If $-1$ m$^3<=V_{IOflow}<=1$ m$^3$, then neither of these conditions is satisfied, so there is no suggestion of a loss or influx. In other words, $V_{IOflow}$ is in a normal range.

Or, for example, $V_{alarm}$ for pump pressure may be 2 m$^3$, wherein if the pump pressure$>2$ m$^3$ then the pump pressure volume alarm condition for influx is satisfied and an influx is indicated, and if the pump pressure$<-2$ m$^3$ then the pump pressure volume alarm condition for loss is satisfied and a loss is indicated.

In other embodiments, $V_{alarm}$ may be the same for all influx alarm conditions, and the same for all loss alarm conditions, but $V_{alarm}$ for the influx alarm conditions is different to $V_{alarm}$ for the loss alarm conditions. For example, $V_{alarm}$ for influx may be 1 m$^3$ for all alarm conditions, whereas $V_{alarm}$ for loss may be $-2$ m$^3$ for all alarm conditions.

In fact, the absolute value of $V_{alarm}$ may be the same for all the alarm conditions and for both of influx and loss. In other words, in the above table, $V_{alarm}$ is identical for all conditions and loss/influx.

In other embodiments, $V_{alarm}$ may be a different value for loss and/or influx and/or different measurements (pump pressure etc).

$V_{alarm}$ may be a constant. In other embodiments, $V_{alarm}$ may be a time varying adaptive threshold. For example, it may be a higher alarm threshold when the method is first employed, before the models are trained well, and/or if the measurements are noisy e.g. in bad weather on a floating drilling rig. This may vary to a smaller threshold when the models are well trained and the measurements are more accurate.

The skilled person would clearly appreciate how to choose appropriate alarm thresholds depending on the particular situation. Measurement accuracy may be estimated and used in the selection of appropriate alarm thresholds.

In one embodiment, when both of the alarm conditions set out in a row of the above table are satisfied, it is established that an influx may have occurred or a loss may have occurred as appropriate. For example, if $V_{IOflow}<-V_{alarm}$ and $V_{IOvol}<-V_{alarm}$, the "flow and volume loss alarm" is triggered, and it is established that a loss may have occurred. In this case, the other alarm conditions may not be evaluated, since it is not necessary to do so if a loss or influx has already been detected. However, in embodiments, even if only alarm conditions relating to two of the measurements are evaluated, a third measurement may still be received, but just not used.

Or, in other embodiments, influx/loss alarm conditions relating to the third measurement may also be evaluated. If two out of the three alarm conditions for loss are satisfied, a loss alarm may be generated. Similarly, if two out of three influx alarm conditions are satisfied, an influx alarm may be generated. Or, the method may require all there alarm conditions for a loss to be satisfied for a loss alarm to be generated (and the same for an influx). In the language of the above table, such an alarm would be a "flow and pressure and loss alarm".

In some situations it may be the case that one of at least three received measurements may not be usable, e.g. there could be a problem with the sensor. Then, an alarm condition associated with this measurement will not be evaluated/used, and the alarm conditions for the remaining at least two measurements will be assessed and used in establishing whether an influx or loss has occurred.

If it is established that an influx or loss has occurred, an alarm is raised. The alarm may be provided by, for example, a visual or aural indicator. The alarm may be located at the rig, for example on the driller's screen 170. In addition, or alternatively, an alarm may be provided remotely. For example, the system may be connected, via means of a network (e.g. via the internet), to a remote facility. The alarm may therefore be displayed 180 to a remote facility, e.g. a real-time support centre. In one embodiment the display may be a web interface. An advantage of this setup includes that, where the system is employed at an offshore rig for example, this enables onshore monitoring of influx and loss events. The alarm having been raised, the driller or other worker alerted by the alarm can take appropriate action, such as to stop drilling and initiate a well control procedure.

It will be well appreciated that the steps of calculating the expected measurements 150 and the detection algorithm 160 will typically be repeated over time during the drilling process, so that monitoring for influx/loss is carried out continuously. Further, the steps of collecting the data 120 and preprocessing the data 130 will typically be repeated over time.

Figure 3A:
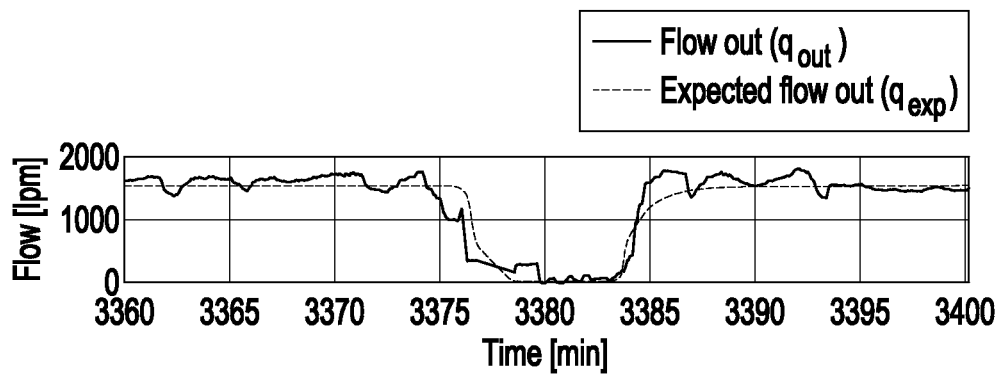
FIGS. 3a to 3c are graphs comparing expected measurements of flow, pump pressure and active volume with actual measurements, calculated utilising the methods described herein.
Figure 3B:
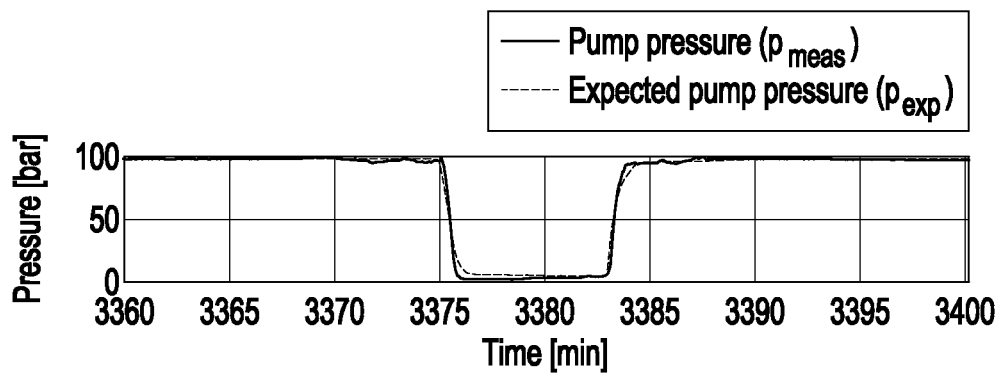
Figure 3C:
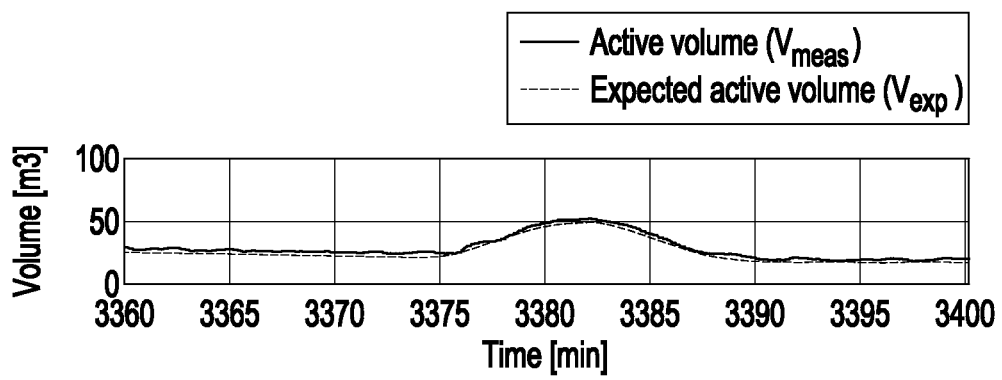

Graphs comparing expected measurements of flow, pump pressure and active volume with actual measurements, calculated utilising the methods described herein, are shown in FIGS. 3a to 3c. The actual measurements are taken from library data from a drilling procedure that was actually carried out, and in which no influx or loss events occurred. The expected measurements have been calculated using the library data from the drilling procedure.

FIG. 3a illustrates flow out rate as a function of time. The calibrated flow out rate ($q_{out}$) is shown with the solid line, and the expected flow out rate ($q_{exp}$) with a dashed line. The calibrated flow out measurement has been calculated from the measured flow out rate according to the equation given at 2) above and the expected flow out rate has been calculated according to the equation given at 3) above. As can be seen, the expected flow out rate substantially tracks the calibrated flow out rate, thus demonstrating that the method described above for determining the expected flow out rate provides an accurate representation.

FIG. 3b illustrates pump pressure as a function of time. The measured pump pressure ($p_{meas}$) is shown with the solid line, and the expected pump pressure ($p_{exp}$) with a dashed line. The expected pump pressure has been calculated according to the equation given at 4) above. As can be seen, the expected pump pressure follows, almost exactly, the measured pump pressure, thus demonstrating that the method described above for determining the expected pump pressure provides an accurate representation.

FIG. 3c illustrates active volume as a function of time. The measured active volume ($V_{meas}$) is shown with a solid line, and the expected active volume ($V_{exp}$) with a dashed line. The expected active volume has been calculated according to the equation given at 5) above. As can be seen, the expected pump pressure follows, almost exactly, the measured active volume, thus demonstrating that the method described above for determining the expected active volume provides an accurate representation.

Since the methods for determining the expected flow rate, pump pressure and active volume provide accurate results, any difference between the expected values and the measured values should provide an accurate indication that an event such as an influx or a loss has occurred.

FIGS. 4a to 4f are graphs illustrating the application of the method of the exemplary embodiment described herein to library data from a drilling operation that was actually carried out and in which a true loss event occurred, in order to test the exemplary method. As discussed below, the method successfully detected the loss event. Thus, should the method have been used in real-time during the drilling process, it would have successfully alarmed the driller of the loss event. The actual measurements are taken from the library data. The expected measurements have been calculated using the library data from the drilling operation and the equations described previously.

Figure 4A:
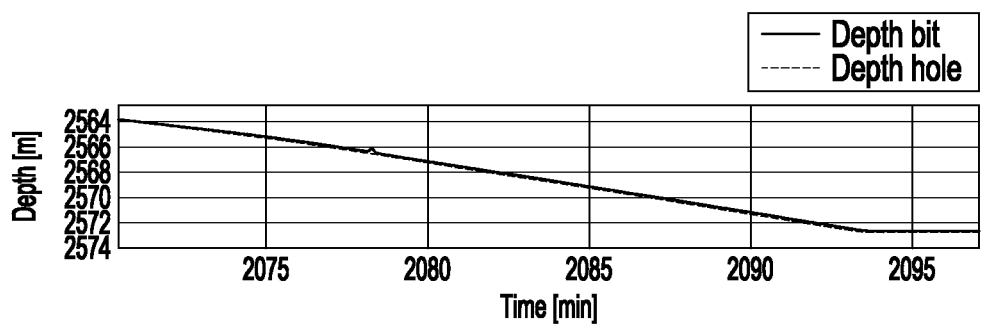
FIGS. 4a to 4f are graphs illustrating the application of the method of the exemplary embodiment described herein to library data of a true loss event, showing the detection of the loss event.

FIG. 4a is simply a graph showing the depth of the drill bit and the depth of the wellbore over time. As would be expected during drilling, the depth of both of these increases over time (note the direction of the values on the y-axis).

Figure 4B:
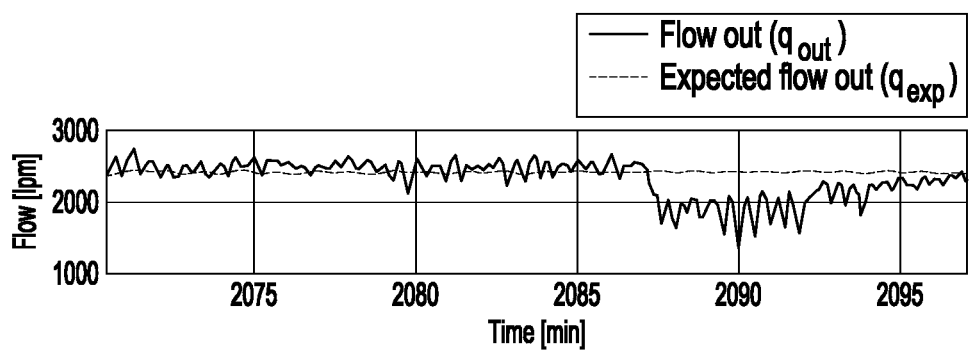

FIG. 4b illustrates flow out rate as a function of time. The calibrated flow out rate ($q_{out}$) is shown with the solid line and the expected flow out rate ($q_{exp}$) with a dashed line.

Figure 4C:
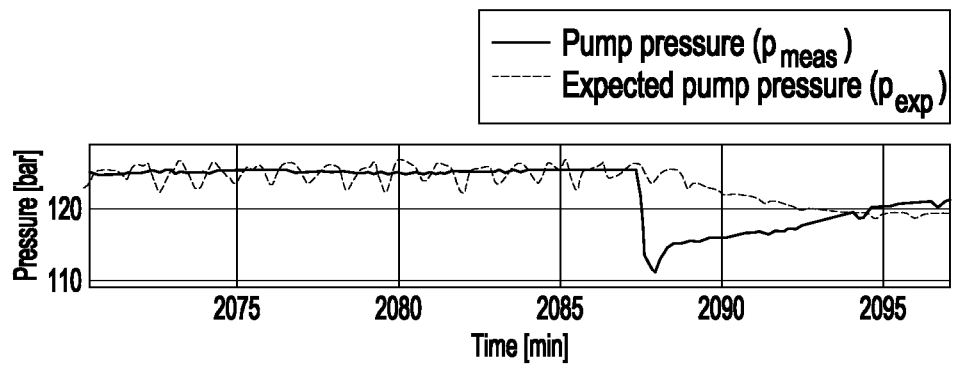

FIG. 4c illustrates pump pressure as a function of time. The measured pump pressure ($p_{meas}$) is shown with the solid line, and the expected pump pressure ($p_{exp}$) with a dashed line.

Figure 4D:
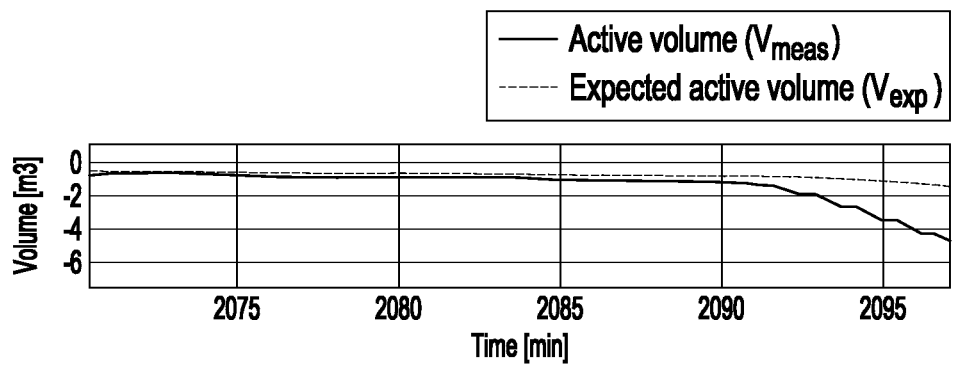

FIG. 4d illustrates active volume as a function of time. The measured active volume ($V_{meas}$) is shown with a solid line, and the expected active volume ($V_{exp}$) with a dashed line.

Figure 4E:
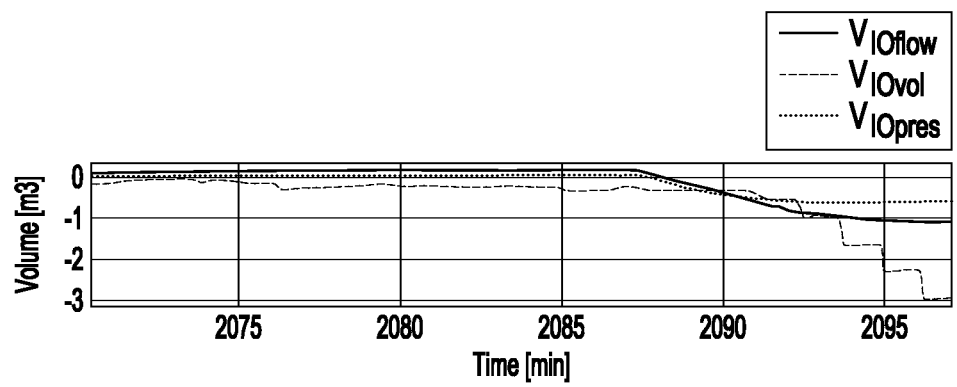

FIG. 4e illustrates the deviated gain/loss volume corresponding to flow, $V_{IOflow}$, which is the difference between the calibrated measured flow out rate $q_{out}$ (i.e. calibrated flow out measurement) and the expected flow out rate $q_{exp}$ as accumulated into a volume, as determined by Equation A above. This is shown by a solid line. It also illustrates the deviated gain/loss volume corresponding to pump pressure, $V_{IOpres}$, which is the difference between the measured pump pressure and the expected pump pressure as accumulated into a volume, as determined by Equation B above. This is shown by a dotted line. Furthermore, this graph also illustrates the deviated active volume value, which is the difference between the measured active volume and the expected active volume. This is shown by a dashed line.

Figure 4F:
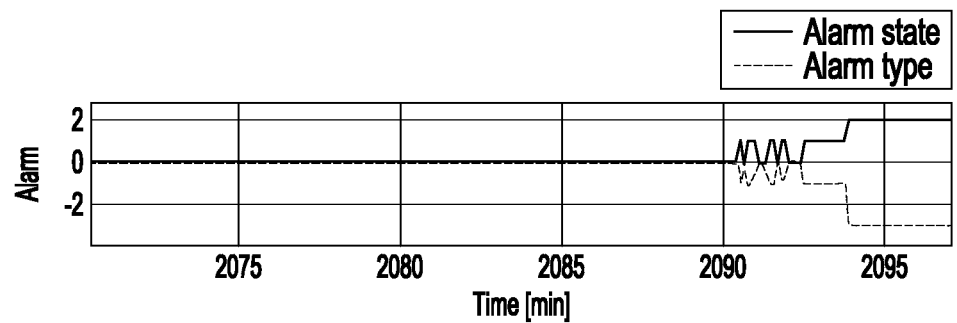

FIG. 4f illustrates the generation of an alarm based on $V_{IOflow}$, $V_{IOvol}$ and $V_{IOpres}$ as in FIG. 4e.

It can be seen that both the calibrated measured flow out $q_{out}$ and the measured pump pressure $p_{meas}$ drop at around 2087 minutes, thus deviating from the expected values. This is when it is known that a loss had in fact occurred. The active volume starts to drop at around 2092 minutes. The deviated volume values shown in FIG. 4e become progressively more negative (i.e. progressively decrease) from 2087 minutes onwards with the deviated active volume decreasing considerably in stages from 2092 minutes onwards. Here, the threshold volume value for $V_{IOvol}$ for a loss was selected as −1 m$^3$. The threshold volume value for $V_{IOflow}$ for a loss was selected as −1 m$^3$. At 2093 minutes, both $V_{IOflow}$ and $V_{IOvol}$ reduced below their respective thresholds. Two out of three of the volumes therefore indicated a loss, i.e. two out of three of the alarm conditions were satisfied. As a result, an alarm was generated. The "alarm state" illustrated in FIG. 4f indicates when an alarm is generated. An alarm state of 1 is a warning (but this warning is not described in further detail in the present application) and an alarm state of 2 is the generation of an alarm.

The alarm type shown by the dashed line shows, at 2093 minutes when the alarm is generated, an alarm type of −3. In the method used here, this number represents a volume and flow out loss alarm, i.e. it indicates a loss based on volume and flow out (note that this is a different alarm type number to the alarm type numbers in the table of alarm types described earlier). Thus, an alarm is provided to the driller advising that a loss has occurred, based on volume and flow out measurements.

The alarm is provided in this case at around six minutes after the loss occurred. In other tests carried out by the inventors, alarms have been provided more quickly after a loss has occurred. However in the example given here, the loss is small and hard to detect, hence it took some minutes for the method to correctly identify the loss.

FIGS. 5a to 5f are graphs illustrating the application of the method of the exemplary embodiment described herein to library data from a drilling operation that was actually carried out and in which a true influx event occurred, in order to test the exemplary method. As discussed below, the method successfully detected the influx event. Thus, should the method have been used in real-time during the drilling process, it would have successfully warned the driller of the influx event. The actual measurements are taken from the library data. The expected measurements have been calculated using the library data from the drilling procedure and the equations described previously.

By way of background, the driller stopped the pump at 3458 minutes to make a connection. The pressure drops as expected, but the well keeps on flowing, and the flowback (i.e. the increase in active volume) is greater than expected. This will now be described in more detail.

Figure 5A:
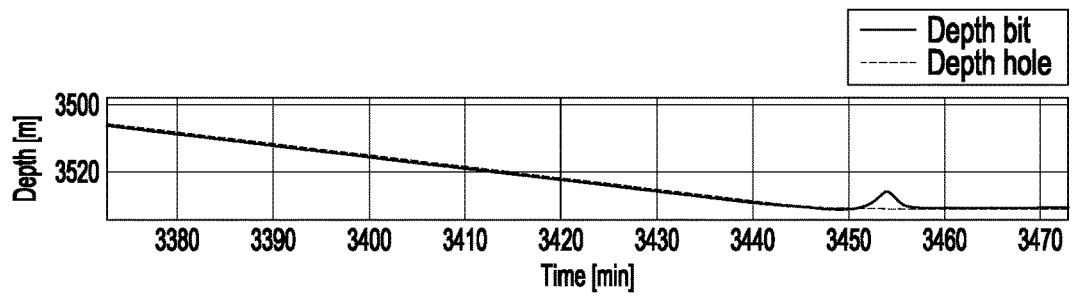
FIGS. 5a to 5f are graphs illustrating the application of the method of the exemplary embodiment described herein to library data of a true influx event, showing the detection of the influx event.

FIG. 5a is simply a graph showing the depth of the drill bit and the depth of the wellbore over time. As would be expected during a drilling operation, the depth of both of these increases over time (note the direction of the values on the y-axis).

Figure 5B:
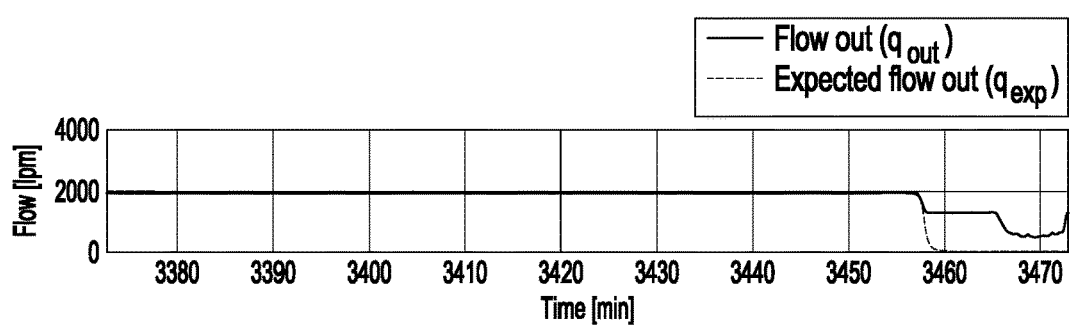

FIG. 5b illustrates flow out rate as a function of time. The calibrated flow out rate ($q_{out}$) is shown with the solid line and the expected flow out rate ($q_{exp}$) with a dashed line.

Figure 5C:
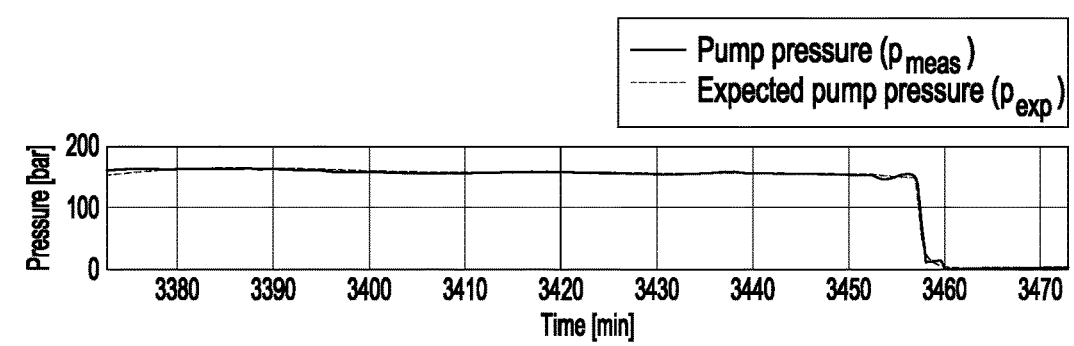

FIG. 5c illustrates pump pressure as a function of time. The measured pump pressure ($p_{meas}$) is shown with the solid line, and the expected pump pressure ($p_{exp}$) with a dashed line.

Figure 5D:
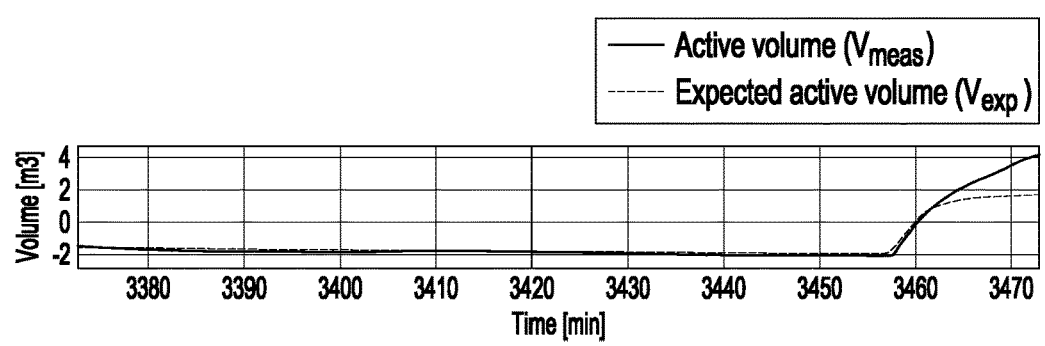

FIG. 5d illustrates active volume as a function of time. The measured active volume ($V_{meas}$) is shown with a solid line, and the expected active volume ($V_{exp}$) with a dashed line.

Figure 5E:
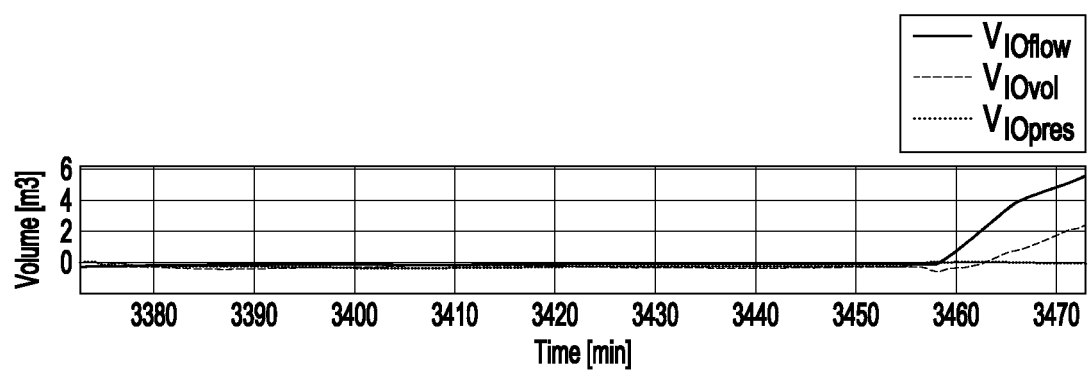

FIG. 5e illustrates the deviated gain/loss volume corresponding to flow, $V_{IOflow}$, which is the difference between the calibrated measured flow out rate $q_{out}$ and the expected flow out rate $q_{exp}$ as accumulated into a volume, as determined by Equation A above. This is shown by a solid line. It also illustrates the deviated gain/loss volume corresponding to pump pressure, $V_{IOpres}$, which is the difference between the measured pump pressure and the expected pump pressure as accumulated into a volume, as determined by Equation B above. This is shown by a dotted line. Furthermore, this graph also illustrates the deviated active volume value, $V_{IOvol}$, which is the difference between the measured active volume and the expected active volume. This is shown by a dashed line.

Figure 5F:
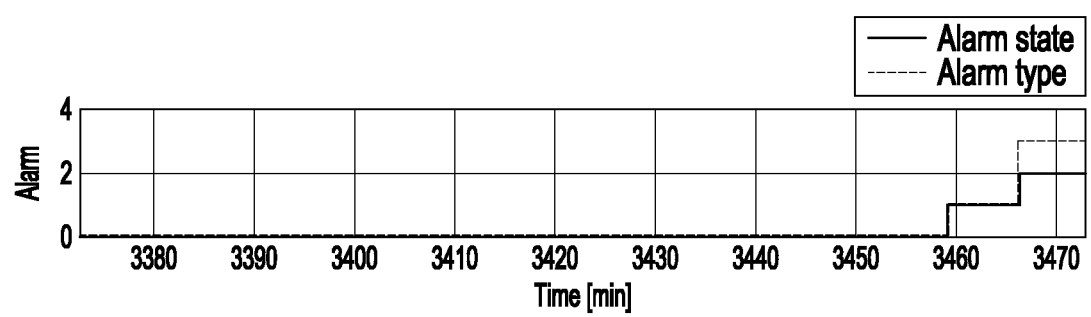

FIG. 5f illustrates the generation of an alarm based on $V_{IOflow}$, $V_{IOvol}$ and $V_{IOpres}$ as in FIG. 5e.

It can be seen that the measured flow out suddenly deviates from the expected flow out at around 3458 minutes. It is known that an influx occurred at this time. The measured active volume then starts to deviate from the expected active volume at around 3463 minutes. The measured pump pressure does not deviate from the expected pump pressure.

The deviated volume value for flow out $V_{IOflow}$ flow shown in FIG. 5e begins to increase from 3458 minutes, and the deviated active volume value $V_{IOvol}$ begins to increase from 3463 minutes.

Here, the threshold volume value for $V_{IOvol}$ for an influx was selected as 1 m³. The threshold volume value for $V_{IOflow}$ for an influx was selected as 1 m³. At 3466 minutes, both $V_{IOvol}$ and $V_{IOflow}$ have now increased above their respective thresholds ($V_{IOvol}$ increased above the threshold at about 3460 minutes, but the $V_{IOflow}$ did not also increase above the threshold until 3466 minutes). Two out of three of the volumes therefore indicated an influx (i.e. two out of three of the alarm conditions are satisfied). As a result, an alarm was generated. The "alarm state" illustrated in FIG. 5f indicates when an alarm is generated. An alarm state of 1 is a warning and an alarm state of 2 is the generation of an alarm.

The alarm type shown by the dashed line shows, at 3466 minutes when the alarm is generated, an alarm type of 2. In this example, this is a volume and flow influx alarm, i.e. it indicates an influx based on volume and flow. (Note that this is a different alarm type number to the alarm type numbers in the table of alarm types described earlier). Thus, an alarm is provided to the driller advising that an influx has occurred based on volume and flow measurements. The alarm is provided in this case at around eight minutes after the influx occurred.

While the apparatus and methods of the subject disclosure have been shown and described with reference to embodiments, those skilled in the art will readily appreciate that changes and/or modifications may be made thereto without departing from the scope of the subject disclosure.

The invention claimed is:

1. A method of monitoring for influx and/or loss events in a wellbore, comprising:
receiving at least three independent measurements relating to fluid entering or leaving the wellbore;
comparing each of at least two of these measurements with an expected value for that respective measurement to provide at least two respective deviated measurement values;
at least one of establishing whether an influx event may have occurred and establishing whether a loss event may have occurred based on these at least two deviated measurement values;
wherein one of the independent measurements is a measurement of pump pressure, one of the independent measurements is a measurement of flow out rate, and one of the independent measurements is of active volume;
at least one of the steps of:
utilising one of the deviated measurement values to determine if an influx alarm condition indicative of an influx event is satisfied and utilising the other deviated measurement value to determine if a further influx alarm condition indicative of an influx event is satisfied; and
utilising one of the deviated measurement values to determine if a loss alarm condition indicative of a loss event is satisfied and utilising the other deviated measurement value to determine if a further loss alarm condition indicative of a loss event is satisfied;
comparing the third of the at least three measurements with an expected value for the measurement to provide an additional deviated measurement value; and
utilising the additional deviated measurement value to determine if an additional influx alarm condition indicative of an influx event is satisfied and/or if an additional loss alarm condition indicative of a loss event is satisfied.

2. The method as claimed in claim 1, wherein determining if the influx alarm condition or the further influx alarm condition is satisfied comprises comparing each deviated measurement value or a value derived from the deviated measurement value with a respective influx alarm threshold value; and if the deviated measurement value or value derived from the deviated measurement value is greater than the respective influx alarm threshold value, it is determined that the respective influx alarm condition is satisfied.

3. The method as claimed in claim 1, wherein determining if the loss alarm condition or the further loss alarm condition is satisfied comprises comparing each deviated measurement value or a value derived from the deviated measurement value with a respective loss alarm threshold value; and if the deviated measurement value or value derived from the deviated measurement value is less than the respective loss alarm threshold value, it is determined that the respective loss alarm condition is satisfied.

4. The method as claimed in claim 1, wherein if both the influx alarm condition and the further influx alarm condition are satisfied it is established that an influx event may have occurred;
or wherein if both the loss alarm condition and the further loss alarm condition are satisfied it is established that a loss event may have occurred.

5. The method as claimed in claim 1, wherein utilising the additional deviated measurement value to determine if the additional influx alarm condition of an influx event is satisfied comprises:
comparing the additional deviated measurement value or a value derived from the additional deviated measurement value with an additional influx alarm threshold value; and if the additional deviated measurement value or value derived from the additional deviated measurement value is greater than the additional influx alarm threshold value, it is determined that the additional influx alarm condition is satisfied.

6. The method as claimed in claim 1, wherein utilising the additional deviated measurement value to determine if the additional loss alarm condition of a loss event is satisfied comprises:
comparing the additional deviated measurement value or a value derived from the additional deviated measurement value with an additional loss alarm threshold value; and if the additional deviated measurement value or value derived from the additional deviated measurement value is less than the additional loss alarm threshold value, it is determined that the additional loss alarm condition is satisfied.

7. The method as claimed in claim 1, further comprising at least one of the steps of:
determining whether at least two out of the at least three influx alarm conditions are satisfied, and if they are, establishing that an influx event may have occurred; and determining whether at least two out of the at least three loss alarm conditions are satisfied, and if they are, establishing that a loss event may have occurred.

8. The method as claimed in claim 1, wherein if it is established that one of an influx event and a loss event may have occurred, the method further comprises raising an alarm.

9. The method as claimed in claim 8, wherein the alarm comprises a visual or aural indicator.

10. A system configured to monitor for influx and/or loss events in a wellbore, comprising:
at least three sensors, each arranged to obtain an independent measurement relating to fluid entering or leaving the wellbore; and
a processor configured to:
compare each of the at least three measurements with an expected value for that respective measurement to provide at least three respective deviated measurement values; and
perform at least one of the steps of:
utilising each of these at least three deviated measurement values to determine if a respective influx alarm condition indicative of an influx event is satisfied and determine whether at least two out of the at least three influx alarm conditions are satisfied, and if they are, establish that an influx event may have occurred; and
utilising each of these at least three deviated measurement values to determine if a respective loss alarm condition indicative of a loss event is satisfied and determine whether at least two out of the at least three loss alarm conditions are satisfied, and if they are, establish that a loss event may have occurred;
wherein one of the sensors is a pump pressure sensor, one of the sensors is a flow out rate sensor, and one of the sensors is an active volume sensor such that the independent measurements are of pump pressure, flow out rate, and active volume respectively.

11. The system as claimed in claim 10, further comprising:
a visual or aural indicator arranged to raise an alarm if it is established that an influx event or a loss event may have occurred.

12. The system as claimed in claim 10, wherein the processor is configured to write in a database that it is established that an influx event or a loss event may have occurred.

13. A method of monitoring for influx and/or loss events in a wellbore, comprising:
receiving at least three independent measurements relating to fluid entering or leaving the wellbore, wherein one of the independent measurements is a measurement of pump pressure, one of the independent measurements is a measurement of flow out rate, and one of the independent measurements is of active volume;
comparing each of these at least three measurements with an expected value for that respective measurement to provide at least three respective deviated measurement values; and
comprising at least one of the steps of:
utilising each of these at least three deviated measurement values to determine if a respective influx alarm condition indicative of an influx event is satisfied and determining whether at least two out of the at least three influx alarm conditions are satisfied, and if they are, establishing that an influx event may have occurred; and
utilising each of these at least three deviated measurement values to determine if a respective loss alarm condition indicative of a loss event is satisfied; and determining whether at least two out of the at least three loss alarm conditions are satisfied, and if they are, establishing that a loss event may have occurred.

14. The method as claimed in claim 13, wherein determining if each of the at least three influx alarm conditions is satisfied comprises comparing each respective deviated measurement value or a value derived from the respective deviated measurement value with a respective influx alarm threshold value; and if the respective deviated measurement value or value derived from the respective deviated measurement value is greater than the respective influx alarm threshold value, it is determined that the respective influx alarm condition is satisfied.

15. The method as claimed in claim 13, wherein determining if each of the at least three loss alarm conditions is satisfied comprises comparing each respective deviated measurement value or a value derived from the respective deviated measurement value with a respective loss alarm threshold value; and if the respective deviated measurement value or value derived from the respective deviated measurement value is less than the respective loss alarm threshold value, it is determined that the respective loss alarm condition is satisfied.

16. The method as claimed in claim 13, wherein if it is established that one of an influx event and a loss event may have occurred, the method further comprises raising an alarm.

17. A method as claimed in claim 16, wherein the alarm comprises a visual or aural indicator.

* * * * *